(12) United States Patent
Nester et al.

(10) Patent No.: US 8,871,173 B2
(45) Date of Patent: Oct. 28, 2014

(54) METHOD FOR CARBON BLACK PRODUCTION USING PREHEATED FEEDSTOCK AND APPARATUS FOR SAME

(75) Inventors: Serguei Nester, Billerica, MA (US); Frederick H. Rumpf, Billerica, MA (US); Yakov E. Kutsovsky, Billerica, MA (US); Charles A. Natalie, Billerica, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 13/588,551

(22) Filed: Aug. 17, 2012

(65) Prior Publication Data

US 2013/0039841 A1 Feb. 14, 2013

Related U.S. Application Data

(63) Continuation of application No. PCT/US2011/024295, filed on Feb. 10, 2011.

(60) Provisional application No. 61/306,092, filed on Feb. 19, 2010.

(51) Int. Cl.
*C09C 1/50* (2006.01)
*B01J 19/26* (2006.01)

(52) U.S. Cl.
CPC . *C09C 1/50* (2013.01); *B01J 19/26* (2013.01); *B01J 2219/00076* (2013.01); *B01J 2219/00087* (2013.01); *B01J 2219/00123* (2013.01); *B01J 2219/00157* (2013.01); *B01J 2219/00159* (2013.01); *B01J 2219/00162* (2013.01); *B01J 2219/00164* (2013.01); *B01J 2219/00166* (2013.01); *C01P 2006/12* (2013.01)
USPC ...................................... 423/450; 423/449.1

(58) Field of Classification Search
USPC .............................................. 423/449.1, 450
See application file for complete search history.

(56) References Cited

U.S. PATENT DOCUMENTS

| | | |
|---|---|---|
| 2,785,964 A | 3/1957 | Pollock |
| 3,095,273 A | 6/1963 | Austin |
| 3,288,696 A | 11/1966 | Orbach |
| 3,401,020 A | 9/1968 | Kester et al. |
| 3,420,632 A | 1/1969 | Ryan |
| 3,619,140 A | 11/1971 | Morgan et al. |
| 3,922,335 A | 11/1975 | Jordan et al. |
| RE28,974 E | 9/1976 | Morgan et al. |
| 3,984,528 A | 10/1976 | Cheng et al. |
| 4,101,639 A | 7/1978 | Surovikin et al. |
| 4,198,469 A | 4/1980 | Dahmen et al. |
| 4,292,291 A | 9/1981 | Rothbuhr et al. |
| 4,315,901 A | 2/1982 | Cheng et al. |
| 4,327,069 A | 4/1982 | Cheng |
| 4,328,199 A | 5/1982 | Cheng et al. |
| 4,370,308 A | 1/1983 | Williams et al. |
| 4,383,973 A | 5/1983 | Cheng |
| 4,439,400 A | 3/1984 | Cheng et al. |
| 4,542,007 A | 9/1985 | Murray |
| 4,582,695 A | 4/1986 | Dilbert et al. |
| 4,585,644 A * | 4/1986 | Divis et al. .................... 423/450 |
| 4,636,375 A | 1/1987 | Rothbuhr et al. |
| 4,664,901 A | 5/1987 | Henderson |
| 4,737,531 A | 4/1988 | Rogers |
| 4,765,964 A | 8/1988 | Gravley et al. |
| 4,826,669 A | 5/1989 | Casperson |
| 4,879,104 A | 11/1989 | List et al. |
| 4,988,493 A | 1/1991 | Norman et al. |
| 5,110,576 A | 5/1992 | Soeda et al. |
| 5,137,962 A | 8/1992 | Green |
| 5,188,806 A | 2/1993 | Kuehner et al. |
| 5,190,739 A | 3/1993 | MacKay et al. |
| 5,229,452 A | 7/1993 | Green et al. |
| 5,262,146 A | 11/1993 | Kanamaru et al. |
| 5,264,199 A | 11/1993 | Sakaue et al. |
| 5,419,889 A | 5/1995 | Matsumoto et al. |
| 5,486,674 A | 1/1996 | Lynum et al. |
| 5,505,929 A | 4/1996 | Matsumoto et al. |
| 5,527,518 A | 6/1996 | Lynum et al. |
| 5,593,644 A | 1/1997 | Norman et al. |
| 5,877,250 A | 3/1999 | Sant |
| 5,904,762 A | 5/1999 | Mahmud et al. |
| 5,914,093 A | 6/1999 | Nakamura |
| 5,997,837 A | 12/1999 | Lynum et al. |
| 6,086,841 A | 7/2000 | Lee |
| 6,153,684 A | 11/2000 | Shieh et al. |
| 6,156,837 A | 12/2000 | Branan, Jr. et al. |
| 6,348,181 B1 | 2/2002 | Morgan |
| 6,403,695 B1 | 6/2002 | Soeda et al. |

(Continued)

FOREIGN PATENT DOCUMENTS

| | | |
|---|---|---|
| CA | 682982 | 3/1964 |
| CA | 2342928 A1 | 3/2000 |

(Continued)

OTHER PUBLICATIONS

Search Report and Written Opinion issued in corresponding Netherlands Patent Application No. 2006221, dated Oct. 10, 2012 (5 pages).
Search Report issued in corresponding French Patent Application No. 1151355, dated Jul. 24, 2012 (4 pages).
International Search Report and Written Opinion issued in corresponding International Patent Application No. PCT/US2011/024295 dated Oct. 31, 2011 (10 pages).
Search Report issued in corresponding Polish Patent Application No. 401614, dated Dec. 10, 2012 (1 page).

(Continued)

*Primary Examiner* — Stuart Hendrickson

(57) ABSTRACT

Methods for production of carbon black using high temperature feedstock at temperatures exceeding about 300° C. with fouling control are provided. An apparatus for production of carbon black according to these methods also is provided.

55 Claims, 4 Drawing Sheets

(56) References Cited

U.S. PATENT DOCUMENTS

| | | |
|---|---|---|
| 6,471,937 B1 | 10/2002 | Anderson et al. |
| 6,485,693 B1 | 11/2002 | Morgan |
| 6,585,949 B1 | 7/2003 | Green et al. |
| 6,926,877 B2 | 8/2005 | Green |
| 7,097,822 B1 | 8/2006 | Godal et al. |
| 7,625,527 B2 | 12/2009 | Suzuki |
| 2002/0090325 A1 | 7/2002 | Hasegawa et al. |
| 2004/0241081 A1 | 12/2004 | Ayala et al. |
| 2005/0089468 A1 | 4/2005 | Wansbrough et al. |
| 2006/0034748 A1 | 2/2006 | Lewis et al. |
| 2006/0204429 A1 | 9/2006 | Bool et al. |
| 2006/0204430 A1 | 9/2006 | Bool et al. |
| 2006/0210468 A1 | 9/2006 | Veenstra |
| 2009/0050530 A1 | 2/2009 | Spicer et al. |
| 2011/0236816 A1 | 9/2011 | Stanyschofsky et al. |

FOREIGN PATENT DOCUMENTS

| | | |
|---|---|---|
| DE | 3111913 A1 | 10/1982 |
| EP | 0949303 A1 | 10/1999 |
| PL | 116681 | 6/1981 |
| PL | 119365 | 12/1981 |
| PL | 168478 | 2/1996 |
| PL | 196825 B1 | 4/1999 |
| PL | 198902 B1 | 8/1999 |
| PL | 197059 | 2/2008 |
| RU | 2096433 C1 | 11/1997 |
| RU | 2179564 C1 | 2/2002 |
| RU | 2349545 C2 | 3/2009 |
| RU | 2366675 C2 | 9/2009 |
| SU | 1572006 A1 | 9/1997 |
| WO | 93-12030 A1 | 6/1993 |
| WO | 93-20153 A1 | 10/1993 |
| WO | 03016415 A1 | 2/2003 |

OTHER PUBLICATIONS

Orlov et al., "Production and use of carbon black for rubber," Yaroslavl, Russia, 2002, (partial English translation of sections) (7 pages).

Alexandrovich, "Technological advances in production of semi reinforcing grades of carbon black from liquid hydrocarbon feedstock," Gubkin Russian State University of oil and gas, Tataneft OAO, Moscow, 2008, (partial English translation of sections) (4 pages).

English Translation of Polish Office Action dated Nov. 12, 2013 issued in corresponding Polish Patent Application No. 401614 (4 pages).

English language translation of Russian Office Action issued in corresponding Russian Patent Application No. 2012140016 (7 pages).

Kasatkin, "Basic processes and apparatuses of chemical technology," Moscow, State Scientific and Technical Publishing of Chemical Literature, pp. 30-34 and 76, 1961 (See English language translation of Russian Office Action for relevance discussing D2).

Ivanovsky, "Carbon Black. Processes and Apparatuses," pp. 54, 63-65, 86-87, Omsk, 2004 with a partial English language translation.

Orlov, "Production and Use of Technical Carbon for Rubber," pp. 155, 157-158, Yaroslavl, 2002 with a partial English language translation.

\* cited by examiner

METHOD FOR CARBON BLACK PRODUCTION USING PREHEATED FEEDSTOCK AND APPARATUS FOR SAME

This application is a continuation of International Patent Application No. PCT/US2011/024295, filed Feb. 10, 2011, which in turn claims the benefit under 35 U.S.C. §119(e) of prior U.S. Provisional Patent Application No. 61/306,092, filed Feb. 19, 2010, which is incorporated in its entirety by reference herein.

BACKGROUND OF THE INVENTION

The present invention relates to methods for production of carbon black using preheated feedstock with fouling control. The present invention also relates to an apparatus for production of carbon black using preheated feedstock with fouling control. The present invention also relates to carbon black resulting from the processes of the present invention.

Carbon blacks are widely utilized, for example, as pigments in ink compositions, paints and the like, as fillers and reinforcing pigments in the compounding and preparation of rubber compositions and plastic compositions, and for a variety of other applications. Carbon blacks are generally produced in a furnace-type reactor by reacting a hydrocarbon feedstock with hot combustion gases to produce combustion products containing particulate carbon black. In the carbon black literature, this reaction between the combustion gases and the hydrocarbon feedstock is generally referred to as pyrolysis.

A variety of methods for producing carbon blacks are generally known. In one type of a carbon black furnace reactor, such as shown in U.S. Pat. No. 3,401,020 to Kester et al., or U.S. Pat. No. 2,785,964 to Pollock, a fuel, such as hydrocarbonaceous fuel, and an oxidant, such as air, are injected into a first zone and react to form hot combustion gases. A hydrocarbonaceous feedstock in either gaseous, vapor or liquid form is also injected into the first zone whereupon reaction of the hydrocarbonaceous feedstock commences. The resulting combustion gas mixture, in which the reaction is occurring, then passes into a reaction zone where completion of the carbon black forming reaction occurs. In another type of carbon black furnace reactor, a liquid or gaseous fuel is reacted with an oxidant, such as air, in the first zone to form hot combustion gases. These hot combustion gases pass from the first zone, downstream through the reactor, into a reaction zone and beyond. To produce carbon blacks, a hydrocarbonaceous feedstock is injected at one or more points into the path of the hot combustion gas stream. Generally the hydrocarbonaceous feedstock is a hydrocarbon oil or natural gas. The first (or combustion) zone and the reaction zone may be divided by a choke or zone of restricted diameter which is smaller in cross section than the combustion zone or the reaction zone. The feedstock may be injected into the path of the hot combustion gases upstream of, downstream of, and/or in the restricted diameter zone. The hydrocarbon feedstock may be introduced in atomized and/or non-atomized form, from within the combustion gas stream and/or from the exterior of the combustion gas stream. Carbon black furnace reactors of this type are shown, for example, in U.S. Reissue Pat. No. 28,974, to Morgan et al., and U.S. Pat. No. 3,922,335, to Jordan et al.

In generally known reactors and processes, the hot combustion gases are at a temperature sufficient to effect the reaction of the hydrocarbonaceous feedstock injected into the combustion gas stream. In one type of reactor, such as the above-indicated U.S. Pat. No. 3,401,020 to Kester et al., feedstock is injected, at one or more points, into the same zone where combustion gases are being formed. In other type reactors or processes, the injection of the feedstock occurs, at one or more points, after the combustion gas stream has been formed. The mixture of feedstock and combustion gases in which the reaction is occurring is sometimes hereinafter referred to, throughout the application, as "the reaction stream." The residence time of the reaction stream in the reaction zone of the reactor is sufficient to allow the formation of desired carbon blacks. In either type of reactor, since the hot combustion gas stream is flowing downstream through the reactor, the reaction occurs as the mixture of feedstock and combustion gases passes through the reaction zone. After carbon blacks having the desired properties are formed, the temperature of the reaction stream is lowered to a temperature such that the reaction is stopped, and carbon black product can be recovered.

Other patents, such as U.S. Pat. No. 3,922,335 to Jordan et al.; U.S. Pat. No. 4,826,669 to Casperson; U.S. Pat. No. 6,348,181 to Morgan; and U.S. Pat. No. 6,926,877 to Green, also show the processes for producing carbon black, including feedstock temperatures. Typical feedstock temperatures at the point of entry to the reactor, such as shown in U.S. Pat. No. 4,826,669, can range, for example, from 250° F. to 500° F. (121° C. to 260° C.).

The present investigators have recognized that hydrocarbonaceous feedstock temperatures in carbon black production that approach or exceed about 300° C. at the point or prior to the point of entry to the reactor would create a high risk of disruptive levels of thermally induced fouling of feedstock supply lines and equipment. Further, the present investigators believe that methods and systems for producing carbon black that can tolerate such hot feedstocks have not been previously developed, nor have the possible benefits of using hot feedstock operation previously been fully realized or attainable, until the development of the present methods and arrangements for carbon black production.

SUMMARY OF THE PRESENT INVENTION

Accordingly, a feature of the present invention is to provide increased feedstock preheat temperatures in carbon black production with control of thermally induced fouling of the feedstock lines at the increased feedstock temperatures.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates, in part, to a method for producing carbon black including preheating carbon black-yielding feedstock to a temperature of greater than about 300° C. to provide preheated carbon black-yielding feedstock in that temperature range. The feedstock can be heated to a temperature of at least 450° C., or from about 360° C. to about 850° C., or other temperatures exceeding 300° C. The preheated carbon black-yielding feedstock can be supplied in at least one feedstock supply line to at least one feedstock introduction point to the reactor. The preheated carbon black-yielding feedstock is introduced through at least one introduction point to the reactor to combine with a heated gas stream(s) for forming a reaction stream in which carbon black is formed in the reactor. The carbon black in the reaction stream can be quenched for recovery. The present method includes one or more approaches to mitigate risk of thermally induced fouling of the feedstock supply lines at the increased feedstock temperature. These approaches can minimize foulant formation (e.g., reduce coke laydown), remove foulant surface depositions (e.g., increase coke removal), or a combination of both, at the internal walls of the feedstock supply line or lines to maintain feedstock supply lines in operable condition while transporting the preheated feedstock to the reactor. These fouling control approaches can include one or more (or any combination) of:

feeding the carbon black-yielding feedstock at a velocity of at least about 0.2 m/sec (or, e.g., at least about 1 m/sec, or at least about 1.1 m/sec, or at least about 1.6 m/sec, or at least about 2 m/sec, or other velocities greater than about 0.2 m/sec) through at least one heater that heats the carbon black-yielding feedstock to achieve pre-heating, pressurizing the carbon black-yielding feedstock to a pressure greater than about 10 bar prior to entering at least one heater to preheat the carbon black-yielding feedstock (or, e.g., greater than about 20 bar, or greater than about 30 bar, or greater than about 40 bar, or from about 20 to about 180 bar, or from about 30 to about 180 bar, or other pressures greater than about 10 bar), providing a total feedstock residence time of the carbon black-yielding feedstock in the at least one heater for preheating and the preheated carbon black-yielding feedstock in the feedstock supply line before introduction to the reactor of less than about 120 minutes (or, e.g., from about 1 sec to about 120 minutes, or about 1 to about 60 minutes, or other residence times less than about 120 minutes), preheating the feedstock in at least one heater operating at an average heat flux (of internal tube surface) of greater than about 10 kW/m$^2$ (or, e.g., greater than about 20 kW/m$^2$, or from about 20 to about 200 kW/m$^2$, or other average heat fluxes greater than about 10 kW/m$^2$), providing a non-catalytic surface to thermal cracking or polymerization of hydrocarbons on the feedstock-contacting inner walls of the feedstock supply line, periodically feeding at least one purge gas (e.g., steam, air, oxygen, $CO_2$) including an oxidant for carbon, through the feedstock supply line, or any combinations thereof.

The fouling control provided by the present invention can permit at least a portion of the feedstock preheating to be accomplished by heating the feedstock with heat generated by the reactor at the high reaction temperatures. The feedstock preheating conditions and designs made feasible by the present invention can provide advantages and benefits, such as, for example, improved energy recovery, savings in raw material costs, increases in carbon black amounts, reduction of carbon dioxide emissions, reduction in $SO_x$ and/or $NO_x$ emissions, stable or continuous carbon black production for industrially useful durations of time at high feedstock temperature conditions, or any combinations thereof. The process of the present invention can be considered a "greener" process compared to conventional processes due to one or more of these environmental advantages mentioned here.

The present invention also relates to an apparatus for carrying out methods, such as the above-described. The apparatus includes at least a reactor for combining a heated gas stream and at least one high temperature carbon black-yielding feedstock to form a reaction stream in which carbon black is formed in the reactor. Also included is at least one fouling-controlled feedstock supply line for supplying the carbon black-yielding feedstock to at least one feedstock introduction point to the reactor to combine the feedstock with the heated gas stream, and at least one feedstock heater operable to preheat the carbon black-yielding feedstock supplied in the at least one feedstock supply line to a temperature greater than about 300° C. The apparatus further includes at least one pump a) operable to pressurize the carbon black-yielding feedstock to a pressure greater than about 10 bar before the feedstock is preheated to a temperature greater than about 300° C., or b) for providing a feedstock velocity through the at least one feedstock heater that preheats the carbon black-yielding feedstock of at least about 0.2 m/sec, or c) both. A quencher for cooling the carbon black in the reaction stream can be included. The reactor is operable to provide a feedstock residence time in the at least one feedstock heater and the at least one feedstock supply line before introduction to the reactor for the feedstock preheated to a temperature greater than about 300° C. that is less than about 120 minutes. At least a portion of the feedstock preheating can be accomplished on the apparatus, for example, by directly or indirectly heating the feedstock with exothermic heat generated by or in the reactor. The apparatus can have the feedstock heater arranged, for example, within the reactor in the reaction stream, arranged in contact with a heated wall of the reactor, arranged in contact with reactor tail gas, arranged outside the reactor to exchange heat with heated fluid received from a heat exchanger located within the reactor, or any combination of these arrangements using one or more feedstock supply lines. The feedstock heater can be one or more heaters fired with tailgas (from the same and/or different carbon black reactors) or any hydrocarbon-based fuel, and/or can be an electric heater.

For purposes herein, the "supply line" or "at least one feedstock supply line" can be any conduit, pipe, heat exchanger tubing, heat exchanger channel, or other structure suitable for transport of liquid or vapor feedstock, or combinations thereof, through which the feedstock is conveyed to the reactor at the preheated temperature. The "supply line" can be any diameter and/or length. For example, if feedstock is preheated to a temperature of 300° C. during passage through tubing or coils of a heat exchanger and then is fed from the heat exchanger to the reactor via separate piping, the "at least one supply line" would include the portion of the heat exchanger tubing that extends between the location along the tubing inside the heat exchanger at which the feedstock temperature had reached 300° C. and the discharge end of the heat exchanger tubing, and also the piping after the heat exchanger through which the preheated feedstock travels to reach the reactor.

"Control," with respect to coking associated with feedstock, refers to at least reducing (or preventing or slowing down) the level of coking that occurs without the preventive step(s).

It is to be understood that both the foregoing general description and the following detailed description are exemplary and explanatory only and are intended to provide a further explanation of the present invention, as claimed.

The accompanying drawings, which are incorporated in and constitute a part of this application, illustrate aspects of the present invention and together with the description, serve to explain the principles of the present invention. Similar numeral identifiers used in the figures refer to similar features.

DETAILED DESCRIPTION OF THE PRESENT INVENTION

Figure 1:
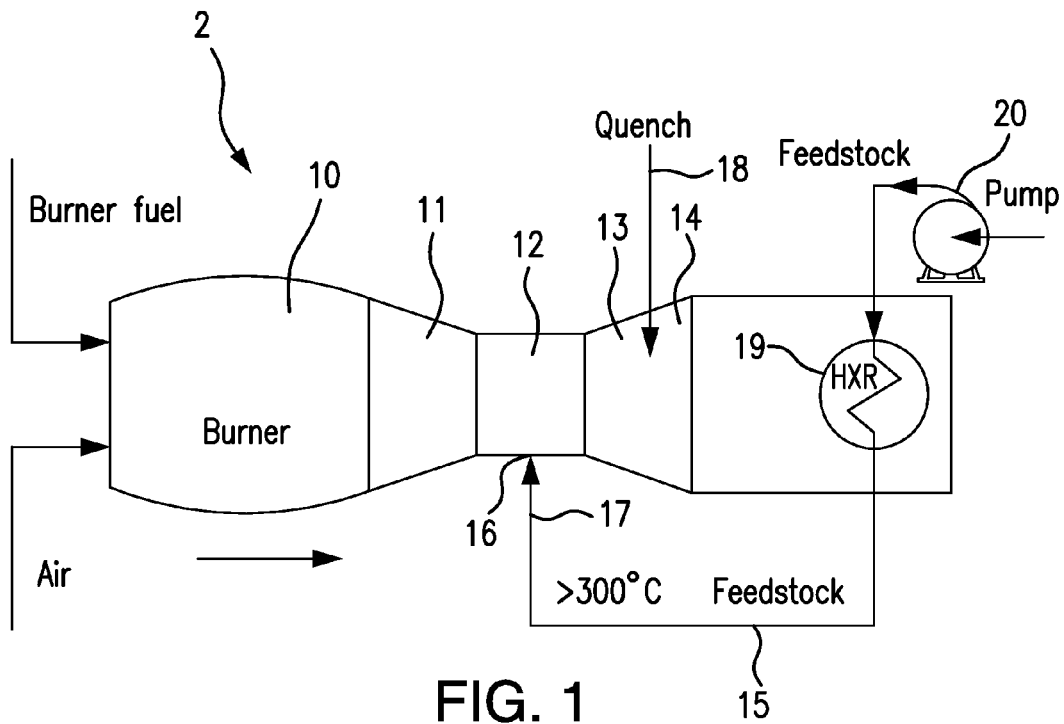
FIG. 1 is a schematic of a portion of a type of furnace carbon black reactor which may be utilized in a process of the present invention to produce carbon blacks. This carbon black reactor is only illustrative of the reactors which may be used in the present invention.

The present invention relates to use of increased feedstock preheat temperatures of greater than about 300° C. in carbon black production unimpeded by feedstock fouling problems. The present invention can be applicable to industrial scale carbon black production, or other scales of production.

The present invention relates in part to a method for producing carbon black. The method can include introducing a heated gas stream into a carbon black reactor. The method further includes supplying at least one carbon black-yielding feedstock having a first temperature below the preheat temperature to be achieved, such as below 300° C. or below 275° C. (e.g., from 40° C. to 274° C., from 50° C. to 270° C., from 70° C. to 250° C., from 60° C. to 200° C., from 70° C. to 150° C., and the like) to at least one heater (e.g., at least two heaters, at least three heaters, and the like where the heaters can be the same or different from each other). The temperature of the feedstock entering the at least one heater is below the targeted preheat temperature or temperature range. The feedstock prior to being preheated can travel, as an option, at a first velocity of least about 0.2 m/sec (e.g., at least about 0.4 m/sec, at least about 0.6 m/sec, at least about 0.8 m/sec, at least about 1 m/sec, at least about 1.1 m/sec, at least about 1.6 m/sec, such as from 0.2 m/sec to 4 m/sec, from 1.1 to 3 m/sec and the like). Other velocities can be used provided other processing conditions are selected to control fouling and/or coking in the heater(s) and supply lines to the reactor.

The method includes preheating the at least one carbon black-yielding feedstock in the at least one heater to a second temperature of greater than about 300° C. (e.g., at least 350° C., at least 360° C., at least 400° C., at least 450° C., at least 500° C., such as from 300° C. to 850° C., or from 360° C. to 800° C., from 400° C. to 750° C., from 450° C. to 700° C. and the like) to provide a preheated carbon black-yielding feedstock, wherein (a) the at least one carbon black-yielding feedstock has a velocity in the at least one heater that is at least 0.2 m/sec, wherein velocity is calculated based on a feedstock density measured at 60° C. at 1 atm and based on the smallest cross-sectional area of a feedstock line present in the at least one heater. Since it can be very difficult to measure velocity of a feedstock at such an elevated temperature, for purposes of the present invention, the velocity as recited herein is based on these specific measuring conditions. Whatever the smallest diameter or smallest cross-sectional area is present in the actual heater, this minimum cross-sectional area is used to determine velocity as recited herein for purposes of the present invention. Many heaters have the same diameter throughout the heater, but in the event that several diameters or cross-sectional areas are present in the heater(s), this condition is provided. Velocity is based upon minimum cross-sectional area. The actual velocity through the feedstock heater can generally be faster than the velocity measured at 60° C. at 1 atm.

In the method, the carbon black-yielding feedstock can have a first feedstock residence time in the heater of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like). For instance, referring to the Figures, the first feedstock residence time would be, for example, the time that the feedstock spends within heater 19 in FIG. 1 or heater 22 in FIG. 2.

The method can include supplying the preheated carbon black-yielding feedstock to at least one feedstock introduction point to the carbon black reactor (e.g., at least one or two or three or four feedstock introduction points), wherein the preheated carbon black-yielding feedstock has a second feedstock residence time measured from exiting the heater(s) to right before the introduction point to the carbon black reactor of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like). The first feedstock residence time and the second feedstock residence time combined are preferably 120 minutes or less (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like). For instance, referring to the Figures, the second feedstock residence time would be, for example, the time that the feedstock exits the heater 19 in FIG. 1 or heater 22 in FIG. 2 to the introduction point to the reactor, shown as introduction point 16 in FIG. 1 and FIG. 2. The combination of the first feedstock residence time and the second feedstock residence time would be the total feedstock residence time.

The method can include combining the preheated carbon black-yielding feedstock through the at least one introduction point(s) to the carbon black reactor with the heated gas stream to form a reaction stream in which carbon black is formed in the carbon black reactor.

The method can include quenching the carbon black in the reaction stream. Other post quenching steps that are conventional in carbon black manufacturing can be used in the methods of the present invention.

As an option, if the feedstock line to the heater is about the same cross-section as the supply line through the heater, the carbon black-yielding feedstock can have a velocity in the heater(s) that is about the same or greater (e.g., at least 1% greater, at least 2% greater, at least 3% greater, at least 5% greater, at least 7% greater, at least 10% greater, at least 100% greater, at least 200% greater, such as from 1% to 200% greater or from 20% to 100% greater and the like) than the first velocity at the entry to the heater(s).

The method of the present invention can include pressurizing the carbon black-yielding feedstock(s). The method can include pressurizing or using a pressure for the carbon black yielding feedstock(s) such that the preheating of the carbon black yielding feedstock avoids formation of vapor film in the at least one heater or prior to supplying to the carbon black reactor. The method of the present invention can include pressurizing the carbon black-yielding feedstock(s) to have a pressure, for instance, of greater than about 10 bar prior to entering the at least one heater that preheats the carbon black-yielding feedstock. This pressure can be at least 15 bar, at least 20 bar, at least 30 bar, at least 40 bar, such as from 10 bar to 180 bar or more, from 15 bar to 150 bar, from 20 bar to 125 bar, from 25 bar to 100 bar.

In the present invention, a method for producing carbon black can include introducing a heated gas stream into a carbon black reactor. The method further includes supplying carbon black-yielding feedstock having a first temperature of below the targeted preheat feedstock temperature, such as below 300° C. or below 275° C. (e.g., from 40° C. to 274° C., from 50° C. to 270° C., from 70° C. to 250° C., from 60° C. to 200° C., from 70° C. to 150° C., and the like) to heater(s) at a first pressure of greater than 10 bar. This pressure can be at least 15 bar, at least 20 bar, at least 30 bar, at least 40 bar, such as from 10 bar to 180 bar or more, from 15 bar to 150 bar, from 20 bar to 125 bar, from 25 bar to 100 bar.

The method can include preheating the at least one carbon black-yielding feedstock in the heater(s) (e.g., at least two heaters, at least three heaters, and the like, where the heaters can be the same or different from each other) to a second temperature of greater than about 300° C. (e.g., at least 350° C., at least 360° C., at least 400° C., at least 450° C., at least 500° C., such as from 300° C. to 850° C., or from 360° C. to 800° C., from 400° C. to 750° C., from 450° C. to 700° C. and the like) to provide a preheated carbon black-yielding feedstock, wherein (a) the carbon black-yielding feedstock has a second pressure in the at least one heater that is about the same or lower (e.g., at least 1% lower, at least 2% lower, at least 3% lower, at least 5% lower, at least 7% lower, at least 10% lower, at least 15% lower, at least 20% lower, such as from 1% to 75% lower or from 3% to 20% lower and the like) than the first pressure and (b) the carbon black-yielding feedstock has a first feedstock residence time in the heater of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like).

The method can include supplying the preheated carbon black-yielding feedstock to at least one feedstock introduction point to the carbon black reactor, wherein the preheated carbon black-yielding feedstock has a second feedstock residence time of from exiting the at least one heater to the introduction point to the carbon black reactor of less than about 120 minutes (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like); and wherein the first feedstock residence time and the second feedstock residence time combined are 120 minutes or less (e.g., less than 100 minutes, less than 80 minutes, less than 60 minutes, less than 40 minutes, less than 30 minutes, less than 20 minutes, less than 10 minutes, such as from 1 second to 119 minutes, from 5 seconds to 115 minutes, from 10 seconds to 110 minutes, from 30 seconds to 100 minutes, from 1 minute to 60 minutes, from 5 minutes to 30 minutes, and the like).

The method can include combining the preheated carbon black-yielding feedstock through the introduction point(s) to the carbon black reactor with the heated gas stream to form a reaction stream in which carbon black is formed in the carbon black reactor. The method can include quenching the carbon black in the reaction stream.

The present invention can relate to a method for producing carbon black that includes introducing a heated gas stream into a carbon black reactor. The method further includes supplying at least one carbon black-yielding feedstock having a first temperature that is below the targeted preheat feedstock temperature, such as below 300° C. or below 275° C. (e.g., from 40° C. to 274° C., from 50° C. to 270° C., from 70° C. to 250° C., from 60° C. to 200° C., from 70° C. to 150° C., and the like) to at least one heater (e.g., at least two heaters, at least three heaters, and the like where the heaters can be the same or different from each other) at a first pressure of greater than 10 bar. As an option, the velocity entering the heater can be a first velocity of at least about 0.2 m/sec (e.g., at least about 0.4 m/sec, at least about 0.6 m/sec, at least about 0.8 m/sec, at least about 1 m/sec, at least about 1.1 m/sec, at least about 1.6 m/sec, such as from 0.2 m/sec to 2 m/sec, from 0.4 to 1.8 m/sec and the like).

The method includes preheating the carbon black-yielding feedstock in the heater(s) to a second temperature of greater than about 300° C. (e.g., at least 350° C., at least 360° C., at least 400° C., at least 450° C., at least 500° C., such as from 300° C. to 850° C., or from 360° C. to 800° C., from 400° C. to 750° C., from 450° C. to 700° C. and the like) to provide a preheated carbon black-yielding feedstock, wherein (a) the carbon black-yielding feedstock has a velocity in the heater(s) that is at least 0.2 m/sec, wherein velocity is calculated based on a feedstock density measured at 60° C. at 1 atm and the smallest cross-sectional area of a feedstock line present in the at least one heater, and (b) wherein the at least one carbon black-yielding feedstock has a second pressure in the heater(s) that is about the same or lower (e.g., at least 1% lower, at least 2% lower, at least 3% lower, at least 5% lower, at least 7% lower, at least 10% lower, at least 15% lower, at least 20% lower, such as from 1% to 25% lower or from 3% to 20% lower and the like) than the first pressure, wherein the pressure can be calculated based on assuming same cross-sectional area that feedstock travels in during first pressure and second pressure (though in actual operation, the cross-sectional area can be the same or different). This manner of determination can be used in order to properly compare pressure, though is not mandatory.

The method can include supplying the preheated carbon black-yielding feedstock to at least one feedstock introduction point to the carbon black reactor and combining at least the preheated carbon black-yielding feedstock through the introduction point(s) to the carbon black reactor with the heated gas stream to form a reaction stream in which carbon black is formed in the carbon black reactor. The method can include quenching the carbon black in the reaction stream.

In the present invention, for any method, the stated target preheat temperatures are preferably an average temperature of the feedstock prior to introduction into the carbon black reactor. The stated preheat temperatures of the feedstock can be a maximum temperature of the feedstock or a minimum temperature of the feedstock prior to introduction into the carbon black reactor.

In the present invention, for any method, the stated target pressure is preferably an average pressure of the feedstock. The stated pressure of the feedstock can be a maximum pressure of the feedstock or a minimum pressure of the feedstock.

In the present invention, for any method, the stated target velocity is preferably an average velocity of the feedstock. The stated velocity of the feedstock can be a maximum velocity of the feedstock or a minimum velocity of the feedstock.

In the present invention, for any method, the carbon black-yielding feedstock can be or include decant oil, coal tar product, ethylene cracker residues, asphaltene containing oil, or any liquid hydrocarbon with a specific gravity of from about 0.9 to about 1.5 or higher (such as from 0.9 to 1.3, or from 1 to 1.2 and the like) or any combination thereof. The carbon black-yielding feedstock can have an initial boiling point of from about 160° C. to about 600° C., such as from 160° C. to about 500° C. or 200° C. to about 450° C. or 215° C. to about 400° C. and the like.

The preheating can occur in any number of ways and no limitations are meant to be placed on the manner to achieve this. The preheating can occur in at least one heater (e.g., one, two, three or more). The source of the heat for the at least one heater can be any source, such as from one or more carbon black reactors, electrical heat, plasma heat, heat from tailgasses, heat from combustion of tailgases, fuels, and/or heat from other industrial processes and/or other forms of heat, and/or any combination thereof. The preheating can occur where the at least one heater partially or completely heats the feedstock to the target preheat temperature for introduction into the reactor. One heater can achieve the partial or complete preheating or two or more heaters can be used in sequence or other arrangements to achieve the preheating (full or partial). If partial preheating is achieved by the at least one heater, then the remaining preheat is accomplished by an additional or a secondary heat source or further heaters to ultimately obtain the target preheat temperature.

For instance, the preheating of the at least one carbon black-yielding feedstock can include or be accomplished by heating the carbon black-yielding feedstock in at least one heater that has a heat exchanger. The heat exchanger can be operating at an average heat flux of greater than about 10 kW/m$^2$ (such as greater than about 10 kW/m$^2$ or greater than about 20 kW/m$^2$ or greater than about 30 kW/m$^2$ or greater than about 40 kW/m$^2$, such as from about 10 kW/m$^2$ to about 150 kW/m$^2$ and the like).

As an option, at least a portion of the preheating (or complete preheating) occurs in at least one heater that has heat at least partially (or completely) provided by heat generated by the carbon black reactor that is receiving the preheated feedstock or another carbon black reactor(s) or both. The at least one heater can be in heat exchange with at least a portion of the carbon black reactor that is receiving the preheated feedstock or a different carbon black reactor(s) or both. For instance, at least one heater can contact the reaction stream in a carbon black reactor, for instance, downstream of a quencher, wherein the at least one heater can have a heat exchanger having walls heated by the reaction stream on a first side (e.g., outer wall) thereof and contacting the carbon black-yielding feedstock on an opposite side (e.g., inner wall) thereof. As an option, the at least one heater can include a heat exchanger that exchanges heat with the reaction stream in a carbon black reactor, wherein a flowable heat carrier that flows through the heat exchanger is heated, and the heat carrier passes through the at least one heater positioned external to the reactor and operable to transfer heat from the heat carrier to the carbon black-yielding feedstock. The at least one heater can be at least partially (or fully) heat sourced with carbon black tail gas (e.g., heat from the tail gas or heat generated by burning tail gas) from the carbon black reactor or a different carbon black reactor(s) or both, to heat the carbon black-yielding feedstock. The preheat can be partially or fully achieved using one or more plasma heaters or other heaters or heat sources.

The introducing of the heated gas stream into the reactor can include plasma heating a plasma-heatable gas stream in a plasma heater to provide at least a portion of the heated gas stream.

A carbon black plasma reactor can be used to receive the pre-heated carbon black yielding feedstock. By using the preheated feedstock and, optionally, preheated carrier gas (such as $N_2$ optional with $O_2$ to control reactivity), the heating method in the reactor can be a non-combustion type and combine the use of indirect preheat of reactants and plasma heating to the required process temperature to form carbon black. The carrier gas can be preheated using conventional air heater technology and/or one of the heater set-ups described herein to preheat the feedstock. A similar setup can be used for the carrier gas as an option. This method reduces electric consumption compared to plasma heating alone, and can reduce raw material costs, reduce $CO_2$ emissions, and/or water consumption.

In the present invention, a non-catalytic surface can be used on some or all of the carbon black-yielding feedstock contacting walls of the at least one heater and/or inner walls of at least one feedstock supply line that supplies the preheated carbon black-yielding feedstock to the carbon black reactor(s). The surface can be non-catalytic to cracking (e.g., thermal cracking) or polymerization of hydrocarbons.

In the present invention, the supplying can include or be the feeding of the preheated carbon black-yielding feedstock through at least one feedstock supply line that supplies to the carbon black reactor(s), and the method further can optionally include periodically feeding a purge gas(es) that can be an oxidant for carbon through the at least one carbon black-yielding feedstock supply line(s). The feedstock supply line exiting the at least one heater that preheats the feedstock can have a cross-sectional area (e.g., diameter) that is the same or different from the supply line that feeds the feedstock into the at least one heater (e.g., can have a smaller or larger cross-sectional area).

In the present invention, the supplying can include feeding the preheated carbon black-yielding feedstock through at least one feedstock supply line that supplies to the carbon black reactor(s), and the method can include injecting the preheated carbon black yielding feedstock into the carbon black reactor with at least partial (or full) flashing (e.g., feedstock evaporation, for instance, achieved by dropping the pressure) of the carbon black-yielding feedstock.

With the present invention, by using one or more cleaning or de-fouling prevention steps described herein, the preheated carbon black-yielding feedstock and the heated gas stream in the carbon black reactor can be combined so as to continuously form carbon black in the reactor for at least about 12 hours (e.g., for at least 24 hours, for at least 48 hours, for at least 72 hours, for at least one week, two weeks, a month or more).

The present investigators have recognized that hydrocarbonaceous feedstocks heated to temperatures exceeding about 300° C. in carbon black production are at great risk of organic fouling (e.g., coking and/or polymerization) of feedstock supply lines and/or heater(s) that would preheat the feedstock. The feedstock supply lines can be steel pipe or other metal constructions that can be susceptible to organic fouling on their internal surfaces. Fouling, if left unchecked, can lead to significantly reduced flow capacity in the feedstock supply lines, and eventually plugged pipes and/or reactor injectors.

Fouling has been identified in the development of the present invention as a main technical barrier for use of high temperature feedstocks in carbon black production. Without desiring to be bound by any particular theory, organic fouling may be caused in carbon black feedstock at high feedstock temperatures due to at least two fouling mechanisms: film boiling and asphaltene-induced coking. In film boiling fouling, it is believed that feedstock evaporates and forms a vapor film that can block heat transfer (i.e., critical heat flux), wherein the vapor film overheats and causes coke to form in vapor phase pyrolysis reactions. Asphaltenes are normally occurring constituents in crude oils, and also carryover at least in part into a variety of carbon black feedstocks at varying concentrations that would pose fouling risks at high temperature (e.g., >300° C.) usage. In asphaltene-induced coking, it is believed that asphaltenes in feedstock may undergo liquid phase pyrolysis wherein the asphaltenes become thermally destabilized to radical forms when exposed to thermal cracking temperatures and combine to form high molecular weight, insoluble coke. High feedstock temperatures, for example, may cause long chain molecules in the feedstock to crack, forming highly reactive compounds which polymerize and foul. Left unchecked, higher feedstock temperatures can tend to cause the asphaltenes in the feedstock to agglomerate and precipitate out onto the feedstock heater and supply line surfaces. Other organic fouling mechanisms may be promoted by high temperature feedstock operation, such as catalytic coking that may be caused by iron or nickel catalyzed thermal cracking reactions of hydrocarbons, depending on the feedstock supply line material. Polymerization of conjugated olefins of feedstock (for instance, promoted by metal, such as iron, nickel, and the like, on the internal tube surface) also is believed to be a potential cause of coking, depending on feedstock chemistry. Insoluble coke or other organic foulants such as described above, if they are permitted to occur in a carbon black production scheme, would deposit out of the feedstock onto inner walls of the feedstock supply lines and reactor injectors and accumulate to plug lines, and thereby disrupt carbon black production for maintenance and/or repairs. The present invention combines antifouling approaches with high temperature feedstock operation to mitigate risk of such thermally-induced fouling of the feedstock lines which otherwise would prevent stable sustained carbon black production.

As determined by the present invention, a sign of coking occurs when there is a rapid pressure drop in the pressure leaving the heater during the preheating of the feedstock compared to the pressure at the heater inlet. Typically, there is a normal pressure drop when comparing the pressure at the heater inlet to the pressure of the feedstock exiting the heater due to friction of the feedstock in the lines. However, as was seen in the development of the present invention, a runaway pressure drop is a sign that coking is highly likely or will occur. In more detail, once steady state operation has occurred and feedstock is flowing through the heater at the desired rate/parameters, a consistent or fairly consistent pressure for the feedstock exiting the heater is established and, as stated above, this pressure is typically below the heater inlet pressure due to frictional forces with the feedstock. However, when vapor filming is occurring and/or coking is beginning to occur, a rapid or runaway pressure drop occurs to the heater outlet pressure for the feedstock exiting the heater outlet. A 2% or more change in the pressure drop, once steady state operation occurs, can be a sign that vapor is forming and that this will lead to coking. A runaway pressure drop of 2% or more, 3% or more, 5% or more, 7% or more, 10% or more, 15% or more, 20% or more, such as 2% to 20% or more, is a sign that vapor is forming and that this will, in all likelihood, lead to coking. As a more specific example, one can have a heater inlet pressure of X for the feedstock entering the heater and, once steady state operation has been reached, the heater outlet pressure (namely the pressure of the feedstock exiting the heater) can have a pressure of from X to (0.8) X, and this pressure, during non-coking operations, will be essentially maintained at this lower pressure during steady state operations. If the parameters of the carbon black manufacturing process are altered, then, of course, the pressure may again change due to a change in parameters. However, in the example, steady state operations have been reached, and therefore the pressure exiting the heater will be essentially maintained with little fluctuation (+/−0% to 1.9%). During steady state operations, if the pressure of the feedstock exiting the heater (or pressure prior to entering the carbon black reactor) drops by more than 2%, such as the percent drops indicated above, this would be a runaway pressure drop, which means that vapor is forming in the feedstock line and that coking will most likely result. The methods of the present invention provide methods for producing carbon black which avoid the formation of vapor film (e.g., avoid the formation of vapor film that blocks the transfer) and/or a runaway pressure drop, and a clear indication of avoiding the formation of vapor film is the avoidance of a runaway pressure drop as indicated herein. As a further example, a runaway pressure drop during steady state operations can be a pressure change of 2% or more, which can occur in a time frame of 15 seconds to 1 hour, or 30 seconds to 30 minutes, or 1 minute to 10 minutes, and this is avoided by the methods of the present invention.

The fouling control strategies applied to carbon black manufacturing of the present invention can reduce or prevent the rate of coke or other foulant laydown on internal walls of the feedstock supply line, remove deposited coke or other foulant, or both. Fouling rates in feedstock supply lines carrying feedstocks heated to greater than about 300° C. can be reduced or prevented by one or more of the following approaches: using a higher feedstock pressure, using a higher feedstock velocity, decreasing heat flux capacity of a feedstock heater, lining feedstock supply lines (inclusive of those in a feedstock heater) with a surface layer of noncatalytic material, decreasing residence time of the feedstock in high temperature sections, or any combinations of these approaches. As indicated, coke removal from the feedstock supply lines can be used as another or additional approach for fouling control in the present invention. Coke deposits, if they occur in the supply line, can be removed, for example, by periodic purging of the feedstock lines with a purge gas or fluid, such as an oxidant for carbon. The feedstock lines can be spalled or mechanically cleaned for coke removal.

For any combination of these antifouling approaches that are used, an objective can be to minimize the net fouling rate that occurs in the feedstock supply line (i.e., the rate of coke laydown less the rate of any decoking (coke removal) implemented). The preheated carbon black-yielding feedstock can be continuously introduced in a reactor to form carbon black in the reactor in a stable manner without disruption (e.g., without fouling plugging feedstock supply lines) for a duration, for example, of at least about 12 hours, or at least 18 hours, or at least about 24 hours, or at least about 30 hours, or more (e.g., 12 hours to 8 months or more, 12 hours to 6 months, 12 hours to 3 months, 20 hours to 1 month). Estimated raw material cost savings for the process of the present invention, such as based on modeling shown in the examples, are in excess of 10% when feedstock is preheated to 500° C., and in excess of 20% when feedstock is preheated to 700° C., in the stable mode of operation provided without feedstock fouling as compared to a conventional feedstock temperature (below 300° C.). There also are two additional benefits of the present invention. One is a yield increase mechanism due to pre-forming seeds in the pyrolysis process. A second mechanism of yield increase is due to flash self-evaporation of the feedstock in the carbon black reactor without cooling surrounding gas. Also, the antifouling strategies of the present invention do not require chemical additives, which may be uneconomical and/or incompatible with the carbon black processing or products.

As indicated, the feedstock can be heated to a temperature of greater than about 300° C., or other temperatures exceeding 500° C. using the present fouling control approaches. The feedstock temperature, due to the present invention's advances, can be, for example, at least 310° C., at least 350° C., at least 375° C., at least 400° C., at least 425° C., at least about 450° C., or at least about 500° C., or at least about 550° C., or at least about 600° C., or at least about 650° C., or at least about 700° C., or at least about 750° C., or at least about 800° C., at least 850° C., or from about 305° C. to about 850° C., or from about 350° C. to about 850° C., or from about 450° C. to about 750° C., or from about 450° C. to about 700° C., or from about 500° C. to about 750° C., or from about 500° C. to about 700° C. This feedstock temperature is the temperature of the carbon black forming feedstock just after exiting the heater(s) used to preheat the feedstock and/or just prior to being introduced into the carbon black reactor. The feedstock temperature in this respect can be measured or sensed at one or more points along the feedstock supply line from the point at which the feedstock temperature has been raised to a value exceeding about 300° C. to the discharge end of the supply line where feedstock in introduced to the reactor. This feedstock supply line includes any length of tubing within a feedstock heater at and after which the feedstock temperature has been raised to a value exceeding about 300° C. and before transport in an additional supply line portion extending from the feedstock heater to the reactor. As an option, the pre-heated feedstock temperature can have an absolute minimum value in the pre-heated feedstock supply line of no less than 301° C., and/or as an option, a maximum variability of the temperature in the pre-heated feedstock supply line can be, for example, ±20%, or ±10%, or ±5%, or ±2.5%, or ±1%, or ±0.5%, considering all points along the feedstock supply line. These indicated feedstock temperatures can be used in combination with the various fouling control process variables indicated herein.

Fouling control using the stated feedstock velocity, at least in part, can include feeding the feedstock(s) at this velocity to the heater and/or through the heater that preheats the feedstock and/or through the feedstock supply line to the reactor. The velocity can be, for example, at least about 0.2 in/sec, or at least about 0.5 m/sec, or at least about 1 m/sec, or at least about 1.6 m/sec, or at least about 2 m/sec, or at least about 3 m/sec, or from about 0.2 m/sec to about 10 m/sec, or from about 1 m/sec to about 7 m/sec, or from about 1.5 m/sec to 3 m/sec, or from about 2 m/sec to about 6 m/sec, or from about 3 m/sec to about 5 m/sec. The feedstock velocity is a linear velocity relative to longitudinal axis of the pipe or other supply line structure. The feedstock velocity (first velocity) is measured at the point of being introduced into the heater that preheats the feedstock. The feedstock velocity through the heater(s) and/or after exiting the heater(s) can be the same or different from the first velocity and for instance can be greater (e.g., at least 1% greater, at least 2% greater, at least 3% greater, at least 5% greater, at least 7% greater, at least 10% greater, at least 100% greater, at least 200% greater, such as from 1% to 300% greater or from 50% to 200% greater and the like). The velocity is measured or calculated based on a feedstock density measured at 60° C. at 1 atm and based on the smallest cross-sectional area present in the feedstock line being measured. This feedstock supply line can include any length of tubing within a feedstock heater at and/or after which the feedstock temperature has been raised to a value exceeding about 300° C. and before transport in an additional supply line portion extending from the feedstock heater to the reactor. For example, the feedstock velocity can have an absolute minimum value in the feedstock supply line of no less than 0.2 m/sec, and/or as an option, a maximum variability of the feedstock velocity in the feedstock supply line can be, for example, ±20%, or ±10%, or ±5%, or ±1%, or ±0.5%, considering all points along the feedstock supply line.

Fouling control using feedstock pressurization, at least in part, can include pressurizing the carbon black-yielding feedstock, for example, to a pressure greater than about 10 bar, or greater than about 20 bar, or greater than about 30 bar, or greater than about 40 bar, or greater than about 50 bar, or from about 10 to about 180 bar, or from about 20 to about 180 bar, or from about 40 to about 180 bar, or from about 50 to about 180 bar or more. The feedstock pressures herein are given as absolute pressures. The pressure (first pressure) is the pressure measured at the point prior to introduction into the heater to pre-heat. The pressure through the heater(s) that preheats the feedstock and/or afterwards to the introduction point(s) to the reactor can be the same or different from the first pressure, such as lower than the first pressure (e.g., at least 1% lower, at least 2% lower, at least 3% lower, at least 5% lower, at least 7% lower, at least 10% lower, at least 15% lower, at least 20% lower, such as from 1% to 25% lower or from 3% to 20% lower and the like). The Gauge pressure measurements should be adjusted to absolute values in a known manner for making comparisons to the ranges shown herein. The feedstock pressure can be measured or sensed at one or more points along the feedstock supply line from the point at which the feedstock temperature has been raised to a value exceeding about 300° C. to the discharge end of the supply line where feedstock in introduced to the reactor. This feedstock supply line can include any length of tubing within a feedstock heater at and after which the feedstock temperature has been raised to a value exceeding about 300° C. and before transport in an additional supply line portion extending from the feedstock heater to the reactor. The pressure can directly trend with feedstock temperature for fouling control. For example, a feedstock pressure of 10 bar may be adequate to control fouling at a feedstock temperature of 300° C., whereas an increased pressure of more than 10 bar, such as 20 bar or more, may be more useful to provide the same level of fouling control if the feedstock temperature is increased to 500° C., all other things the same.

Fouling control using a low total feedstock residence time can be used. The total feedstock residence time can be the combined time spent in the at least one heater for preheating including the time that the preheated carbon black-yielding feedstock spends before introduction to the reactor. The total residence time can be, for example, less than about 120 minutes, or less than about 90 minutes, or less than about 60 minutes, or less than about 45 minutes, or less than about 30 minutes, or less than about 15 minutes, or less than 10 minutes, or less than 5 minutes, or less than 4 minutes, or less than 3 minutes, or less than 2 minutes, or less than 1 minute, or less than 30 seconds, or less than 15 seconds, or from about 1/60 minute to about 120 minutes, or from about 0.5 minute to about 120 minutes, or from about 1 minute to about 90 minutes, or from about 2 minutes to about 60 minutes, or from about 3 minutes to about 45 minutes, or from about 4 minutes to about 30 minutes, or from 5 to 30 minutes, or from 5 to 40 minutes, or from 10 to 30 minutes, or from about 5 minutes to about 15 minutes. The residence time can be an average value or a maximum value or a minimum value. The feedstock residence time can be determined from the point at which the feedstock temperature has been raised to a value exceeding about 300° C. to the point where feedstock is introduced to the reactor. Residence time can inversely trend with feedstock temperature. For example, a feedstock residence time of up to about 120 minutes may be tolerated without fouling problems at a feedstock temperature of 310° C., whereas the residence time can preferably be reduced to less than 120 minutes to provide the same level of fouling control if the feedstock temperature is increased to 500° C., all other things the same.

Fouling control during preheating of the feedstock, for instance, in a feedstock heater, can include use of a heater operating at an average heat flux, for example, of greater than about 10 kW/m$^2$, or greater than about 20 kW/m$^2$, or greater than about 30 kW/m$^2$, or greater than about 50 kW/m$^2$, or greater than about 100 kW/m$^2$, or from about 10 kW/m$^2$ to about 150 kW/m$^2$ (or more), or from about 20 to about 150 kW/m$^2$, or from about 30 to about 100 kW/m$^2$, or from about 40 to about 75 kW/m$^2$, or from about 50 to about 70 kW/m$^2$. Operation at a higher heat flux can be seen as a fouling control measure, because the higher heat flux results in the carbon black-yielding feedstock to heat up faster and/or permits a shorter residence time in the heater since less time is needed to reach the targeted preheat temperature.

Fouling control using a non-catalytic surface to cracking (e.g., thermal cracking) and/or polymerization of hydrocarbons on feedstock-contacting inner walls of the feedstock supply line, at least in part, can include, for example, one or more layer(s) of protective lining, such as a ceramic lining (e.g., silica, alumina, chromium oxide).

Fouling control using periodic on-line feeding of a purge gas through the feedstock supply line can include injecting an oxidant for carbon (e.g., $CO_2$, oxygen, steam, steam and air mixtures) into the feedstock supply line at an accessible point or points along the feedstock line. The purge gas can be introduced at a temperature of 150° C. or higher or exceeding 300° C. downstream of any liquid feedstock pumping means. The steam velocity through the purge line can be, for example, at least about 6 m/sec. Any deadlegs of feedstock can be eliminated so that the purge immediately blows all of the feedstock into the reactor. The purge gas can be introduced upstream of a feedstock heater to further ensure all supply lines exposed to process temperatures exceeding 300° C. are treated.

As indicated, fouling control by coke removal from the feedstock lines can include, for example, spalling or mechanical scraping. Spalling, for example, can involve cooling a coke-coated on-line pipe so that at least some of the coke deposited on the inside of the pipe flakes off or otherwise breaks free from the internal pipe walls as the pipe contracts in size during cooling. The loosened coke can be flushed out of the pipe, and the spalled pipe is ready for use again. During spalling, the feedstock may be diverted from the pipe to be spalled, such as using valving, through an alternate on-line feedline or feedlines to the reactor provided on the apparatus. Once cleaned, the spalled pipe is ready for use again. Another method of cleaning deposited coke out of the feedstock pipes can involve moving a mechanical scraper through the pipe to mechanically remove the coke from the inside of the pipes. During mechanical scraping, the feedstock may be diverted, such as using valving, through an alternate on-line feedline or feedlines to the reactor provided on the apparatus, during the time the pipe taken off-line for cleaning is temporarily out of service. Spalling and/or mechanical scraping, if used, can be performed periodically on the feedstock supply lines.

The carbon black-yielding feedstock that can be processed at high temperatures with fouling control using the present invention generally can include any hydrocarbon liquid or oil feedstocks useful for carbon black production. Suitable liquid feedstocks include, for example, unsaturated hydrocarbons, saturated hydrocarbons, olefins, aromatics, and other hydrocarbons such as kerosenes, naphthalenes, terpenes, ethylene tars, coal tars, cracker residues, and aromatic cycle stocks, or any combinations thereof. The feedstocks can be, for example, decant oil, coal tar product, ethylene cracker residues, asphaltene containing oil, or any combinations thereof. Feedstock type can effect fouling behavior. Chemistries can vary between the different feedstock types and/or within a feedstock type. Based on experience and lab testing, decant oil, coker oil, coal tars, and ethylene cracker residues, for example, all can foul at various temperatures above about 300° C. Ethylene cracker residues (ECR), for example, can be relatively high in asphaltenes. Other feedstock types also can contain asphaltenes and/or have chemistries subject to other fouling mechanisms.

The asphaltene content of the feedstock can be, for example, from 0% to about 30% by weight, or at least about 0.5% by weight, or at least about 1% by weight, or at least about 2% by weight, or at least about 3% by weight, or from about 1% to about 10% by weight, or from about 2% to about 7.5% by weight, or from about 2.5% to about 5% by weight, based on total feedstock weight. The feedstock can have an initial boiling point, for example, of from about 160° C. to about 500° C., or from about 180° C. to about 450° C., or from about 200° C. to about 400° C., or from 225° C. to about 350° C. The initial boiling point refers to temperature at which the first feedstock component (of the feedstock) evaporates. The feedstock can have a midrange boiling point, for example, of from about 380° C. to about 800° C., or from about 400° C. to about 500° C., or from about 425° C. to about 475° C., or from 440° C. to about 460° C. The midrange boiling point refers to temperature at which 50% of feedstock components have evaporated. The feedstock can have a final boiling point, for example, of from about 600° C. to about 900° C., or from about 625° C. to about 725° C., or from about 650° C. to about 700° C., or from 670° C. to about 690° C. The final boiling point refers to temperature at which 100% of feedstock components have evaporated. Other initial, midrange, and/or final boiling points may apply, depending on the choice and chemistry of the feedstock.

Exemplary ranges of combinations of the fouling control process variables are given in Table 1.

TABLE 1

| | Comb. No. | | | | | | |
|---|---|---|---|---|---|---|---|
| | 1 | 2 | 3 | 4 | 5 | 6 | 7 |
| Preheat Temp., °C. | >300 | 360-850 | >450 | >300 | 360-700 | 450-700 | 400-600 |
| Max (1) residence time, minute | 120 | 120-1/60 | 120-1/60 | 45 | 40-5 | 30-5 | 35-10 |
| Velocity (2) min, m/s | 0.2 | 0.2 | 0.2 | 1 | 1.6 | 1.6 | 1.6 |
| Pressure (3), bar | >10 | >20 | 20-180 | >10 | >20 | 30-180 | 30-120 |
| Avg. Heat flux, kW/m$^2$ | >10 | >20 | 20-150 | >10 | >20 | 20-150 | 25-100 |

| FS type Decant oil, coal tar products, ECR, asphaltene containing oils | | | |
|---|---|---|---|
| | Initial boiling point | Midrange boiling point | Final boiling point |
| FS boiling temperature, °C. | 160-500 | 380-800 | 600-900 |

| Coking mechanisms: | Film boiling | Liquid phase pyrolysis | catalytic |
|---|---|---|---|
| Mitigation | Pressure, velocity, heat flux | Temperature, residence time, pressure | Surface Passivation |
| Coke removal | Decoking: steam or steam/air; spalling (on-line); mechanical (off-line) | | |

(1) preheated feedstock prior to reactor
(2) through heater based on test conditions of 60° C. at 1 atm
(3) prior to heater In view of above-described and other guidance provided herein, suitable combinations of process variables for providing fouling control for the preheated feedstock supply lines can be determined in a straightforward manner by a skilled person.

The methods of the present invention can be used with furnace carbon black reactors with adaptations and modifications such as related herein. The methods of the present invention can be practiced, for example, in a modular, also referred to as "staged," furnace carbon black reactor. Staged furnace reactors that can be adapted or modified to practice the present invention are shown, for example, in U.S. Pat. Nos. 3,922,335; 4,383,973; 5,190,739; 5,877,250; 5,904,762; 6,153,684; 6,156,837; 6,403,695; and 6,485,693 B1, all of which are incorporated in their entireties by reference herein. The fouling control provided by the present invention can permit, as an option, at least a portion of the feedstock preheating to be accomplished by heating the feedstock with heat generated by the furnace reactor from one or more locations of the reactor. This benefit is illustrated in the following discussions with reference to several figures.

The present invention also relates to an apparatus for producing carbon black. The apparatus or system includes:

a reactor for combining a heated gas stream and at least one carbon black-yielding feedstock to form a reaction stream in which carbon black is formed in the reactor;

at least one feedstock supply line for supplying the carbon black-yielding feedstock to at least one feedstock introduction point to the reactor to combine the feedstock with the heated gas stream;

at least one feedstock heater operable to preheat the carbon black-yielding feedstock supplied in the at least one feedstock supply line to a temperature of at least about 300° C.;

at least one pump operable to pressurize the carbon black-yielding feedstock to a pressure greater than about 10 bar before the feedstock is preheated to at least about 300° C. and for providing a feedstock velocity in the feedstock heater of at least about 0.2 m/sec, or both; and a quencher for cooling the carbon black in the reaction stream.

The apparatus is operable to provide a feedstock residence time in the at least one feedstock heater and the at least one feedstock supply line before introduction to the reactor for the feedstock preheated to at least about 300° C. that is less than about 120 minutes.

The at least one feedstock heater can be as stated above and can be or include a heat exchanger operable to heat the carbon black-yielding feedstock at an average heat flux of greater than about 10 kW/m$^2$.

The at least one feedstock heater can be positioned within the reactor to be contactable by the reaction stream operable to heat the feedstock to a temperature of at least 300° C., such as at least 370° C. The at least one feedstock heater can be positioned in contact (directly or indirectly) with at least a portion of the reactor operable to heat the feedstock to a temperature of at least 300° C., such as at least 370° C. The at least one feedstock heater can be or include a heat exchanger positioned within the reactor downstream of the quencher, wherein the heat exchanger includes walls adapted to be heated by the reaction stream on a first side thereof and adapted to be contacted by feedstock on an opposite side thereof before the feedstock is supplied to the at least one feedstock supply line, wherein the feedstock is heatable to a temperature of at least 300° C., such as at least 370° C. in the heat exchanger. The apparatus can include at least one heat exchanger for a flowable heat carrier positioned within the reactor to be contactable by the reaction stream, and the at least one feedstock heater is external to the reactor and operable to exchange heat of the flowable heat carrier that has exited the heat exchanger with the feedstock in the feedstock heater to heat the feedstock to a temperature of at least 300° C., such as at least 370° C. The at least one feedstock heater can be operable to exchange heat from a tail gas stream of a reactor (a reactor receiving the preheat feedstock or a different one) to heat the feedstock to a temperature of at least 300° C., such as at least 370° C. The apparatus can include a plasma heater operable for heating a plasma-heatable gas stream for providing at least a portion of the heated gas stream. The apparatus can include non-catalytic surface on some or all of the feedstock contacting walls of the feedstock heater and/or feedstock contacting inner walls of the at least one feedstock supply line, wherein the surface is non-catalytic to thermal cracking or polymerization of hydrocarbons. The apparatus can include non-catalytic ceramic lining on the feedstock contacting walls of the feedstock heater and/or feedstock contacting inner walls of the at least one feedstock supply line. The apparatus can include at least one source of purge gas, such as an oxidant for carbon and at least one purge gas introduction point on the at least one feedstock supply line operable to periodically purge the at least one feedstock supply line with the purge gas. The reactor can be operable to combine feedstock and heated gas stream to continuously form carbon black in the reactor for at least about 12 hours.

As an example, FIG. 1 shows a portion of a type of furnace carbon black reactor which may be used in a process of the present invention to produce carbon blacks wherein at least a portion of the preheating includes heating a carbon black-yielding feedstock with the reaction stream in the reactor to heat the feedstock to a temperature greater than about 300° C. One or more of the indicated fouling control approaches is applied to the process scheme shown in FIG. 1 to support the use of such preheated feedstock.

Referring to FIG. 1, the carbon black of the present invention may be produced in a furnace carbon black reactor 2, having a combustion zone 10, which has an optional zone of converging diameter, 11, a feedstock injection zone(s) 12, and a reaction zone(s) 13. A first quench zone 14 follows the reaction zone 13. Useful diameters and lengths of these various zones that may be used can be selected with reference to the above-indicated patents incorporated by reference. To produce the carbon blacks, hot combustion gases are generated in combustion zone 10, by reacting a liquid or gaseous fuel with a suitable oxidant such as air, oxygen, mixtures of air and oxygen or the like. Among the fuels suitable for use in reacting with the oxidant stream in combustion zone 10, to generate the hot combustion gases are included any of the readily combustible gas, vapor and/or liquid streams such as natural gas, hydrogen, carbon monoxide, methane, acetylene, alcohols, or kerosene. It is generally preferred, however, to utilize fuels having a high content of carbon-containing components and, in particular, hydrocarbons. The stoichiometric ratio of air to natural gas utilized to produce the carbon blacks of the present invention may be from about 0.6:1 to infinity or from about 1:1 (stoichiometric ratio) to infinity. To facilitate the generation of hot combustion gases, the oxidant stream may be preheated. The hot combustion gas stream flows downstream from zones 10 and 11 into zones 12 and 13, and then 14. The direction of the flow of hot combustion gases is shown in FIG. 1 by the arrow. Carbon black-yielding feedstock 15 is introduced at point 16 located in zone 12. The feedstock may be introduced either through a probe(s), radially inward through a plurality of openings positioned in the wall of zone 12 at point 16, or a combination of the two. The feedstock can be introduced axially or radially though a probe(s) axially inserted though the burner anywhere in zones 11, 12, and/or 13 (stinger operation). Suitable for use herein as the types of carbon black-yielding hydrocarbon feedstocks, which can be readily volatilizable under the conditions of the reaction, include the previously indicated feedstocks. Reactor/burner tips may be more susceptible to erosion at high feedstock temperatures. Materials such as STELLITE® 6 metal alloy, for example, may be used to extend tip life.

As shown in FIG. 1, the carbon black-yielding feedstock 15 is preheated to a temperature of greater than about 300° C. before it is introduced into the reactor 2. The preheated carbon black-yielding feedstock is supplied in at least one feedstock supply line 17 to the at least one feedstock introduction point 16 to the reactor 2. Upon introduction, the feedstock combines with the heated gas stream for forming a reaction stream in which carbon black is formed in the reactor. The carbon black in the reaction stream can be quenched in one or more zones. For example, at quench location 18 of quench zone 14, quenching fluid is injected, which can include water, and which can be used to completely or essentially completely stop pyrolysis of the carbon black-yielding feedstock, or only partially cool the feedstock without stopping pyrolysis followed by a secondary quench (not shown) used to stop pyrolysis of the carbon black-yielding feedstock.

As also shown in FIG. 1, the feedstock heater can include a heat exchanger 19 (HXR), which can have heater walls (not shown), such as used in known heat exchanger designs, heated by the reaction stream on a first side thereof and contacting feedstock on an opposite side thereof before the feedstock is supplied to the at least one feedstock supply line. As indicated, the feedstock is heated in the heat exchanger to a temperature greater than about 300° C. Although shown arranged downstream of a quencher, the feedstock heat exchanger may be located upstream of the quencher in the reaction stream, provided the heater has a construction that can tolerate and operate at higher pre-quench temperatures within the reactor. The feedstock heater can be arranged to be in physical contact with at least a portion of the reactor, e.g., as a coil or tubing housed inside and or against and in contact with a heated wall or walls of the reactor, to heat the feedstock to a temperature greater than about 300° C. Though not shown in FIG. 1, the heat exchanger can optionally heat the feedstock to an intermediate temperature (e.g., above 250° C. or 50° C. to 350° C., or other temperatures below the goal preheated temperature) or be used to get the pre-heat temperature above 300° C., and then a further heat exchanger or heater external or internal to the reactor can be used to heat to the final pre-heat temperature.

The reaction stream within the reactor can have a temperature at quench, for example, of from about 600° C. to about 2000° C., or from about 800° C. to about 1800° C., or from about 1000° C. to about 1500° C., or other high temperatures reflecting an extreme exothermic reaction that is generated in the furnace reactor. The present invention can provide feedstock heat exchange with the high exothermic heat generated by the reactions in the reactor without fouling problems arising in the feedstock supply lines. The present invention thus can make it feasible to improve energy recovery and save raw materials costs as compared to conventional carbon black production operating at much lower feedstock temperatures.

As also shown in FIG. 1, at least one pump 20 can be installed in-line on the feedstock line upstream from the feedstock heater 19 used to raise the feedstock temperature to a value exceeding 300° C. The pump can be used to pressurize the feedstock before it enters the feedstock heater. In that manner, the feedstock can be already pressurized at the time the feedstock temperature is increased to elevated values where fouling problems in the feedstock supply line otherwise could arise in the absence of the pressurization or other indicated fouling control approaches. As the feedstock usually can experience a pressure drop during passage through the feedstock heater under normal operating conditions (e.g., a pressure drop of 0 to about 20 bar), depending, for example, on the heat exchanger design and mode of operation, any pressurization applied to the feedstock as a fouling control measure should compensate for any pressure drop that may occur or be expected to occur in a feedstock heat exchanger, as well as any other pressure drop that occurs or can be expected to occur in the supply line pipes or other conduits used to transport the preheated feedstock to the reactor, particularly if necessary to maintain the feedstock pressure within a pre-targeted range value. Although only a single feedstock supply line and feedstock injection point on the reactor is illustrated in FIG. 1, and in other figures herein, for sake of simplifying the illustrations, it is understood that multiple feedstock supply lines and injection points on the reactor can be used to which the indicated fouling controls also can be applied.

After the mixture of hot combustion gases and carbon black-yielding feedstock is quenched, the cooled gases pass downstream into any conventional cooling and separating steps whereby the carbon black is recovered. The separation of the carbon black from the gas stream can be readily accomplished by conventional devices such as a precipitator, cyclone separator or bag filter. With respect to completely quenching the reactions to form the final carbon black product, any conventional process to quench the reaction downstream of the introduction of the carbon black yielding feedstock can be used and is known to those skilled in the art. For instance, a quenching fluid can be injected which may be water or other suitable fluids to stop the chemical reaction.

Figure 2:
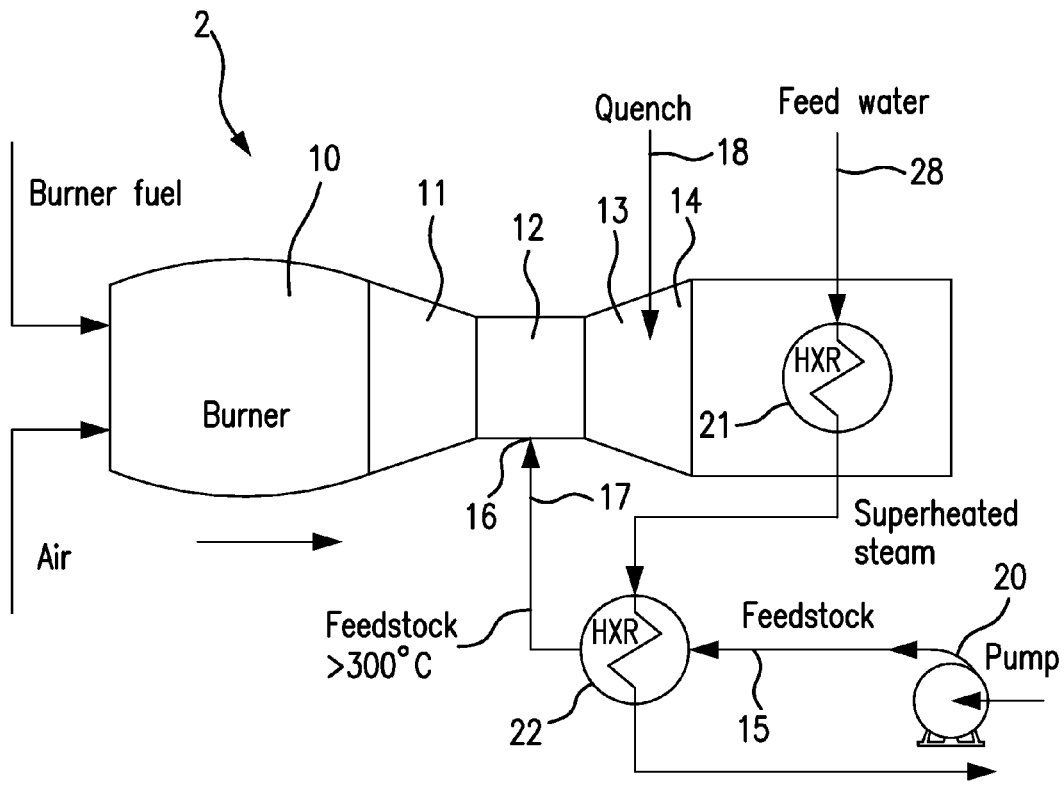
FIG. 2 is a schematic of a portion of another type of furnace carbon black reactor which may be utilized in a process of the present invention to produce carbon blacks. This carbon black reactor is only illustrative of the reactors which may be used in the present invention.

FIG. 2 shows a portion of another type of furnace carbon black reactor which may be used in a process of the present invention to produce carbon blacks wherein at least a portion of the preheating includes contacting a heat exchanger 21 with the reaction stream in the reactor wherein a flowable heat medium or carrier 28, such as steam or nitrogen, flowing through the heat exchanger is heated in the reactor, and the heated steam (e.g., superheated steam) then passes out of the heat exchanger and reactor and is piped through a separate feedstock heater 22 positioned external to the reactor where operable to exchange heat with the feedstock in the feedstock heater to heat the feedstock to a temperature greater than about 300° C., such as 370° C. or greater.

Figure 3:
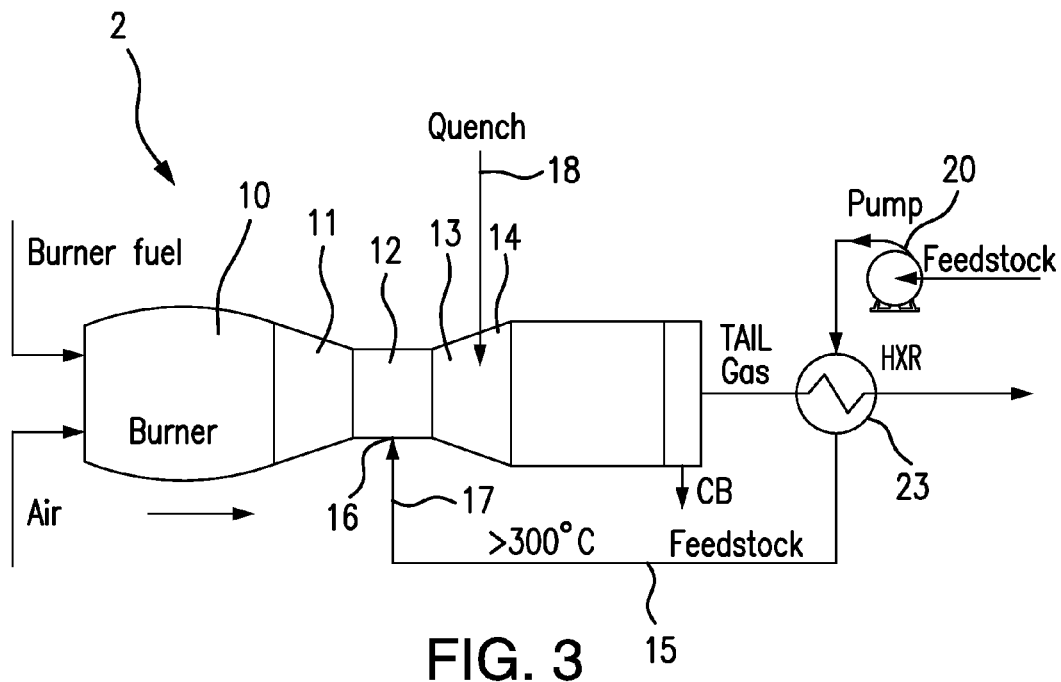
FIG. 3 is a schematic of a portion of yet another type of furnace carbon black reactor which may be utilized in a process of the present invention to produce carbon blacks. This carbon black reactor is only illustrative of the reactors which may be used in the present invention.

FIG. 3 shows a portion of another type of furnace carbon black reactor which may be used in a process of the present invention to produce carbon blacks wherein at least a portion of the preheating includes contacting a feedstock heater 23 with tail gas that has exited the reactor to heat the feedstock in the feedstock heater to a temperature greater than about 300° C. (or at least partly to the goal temperature).

Figure 4:
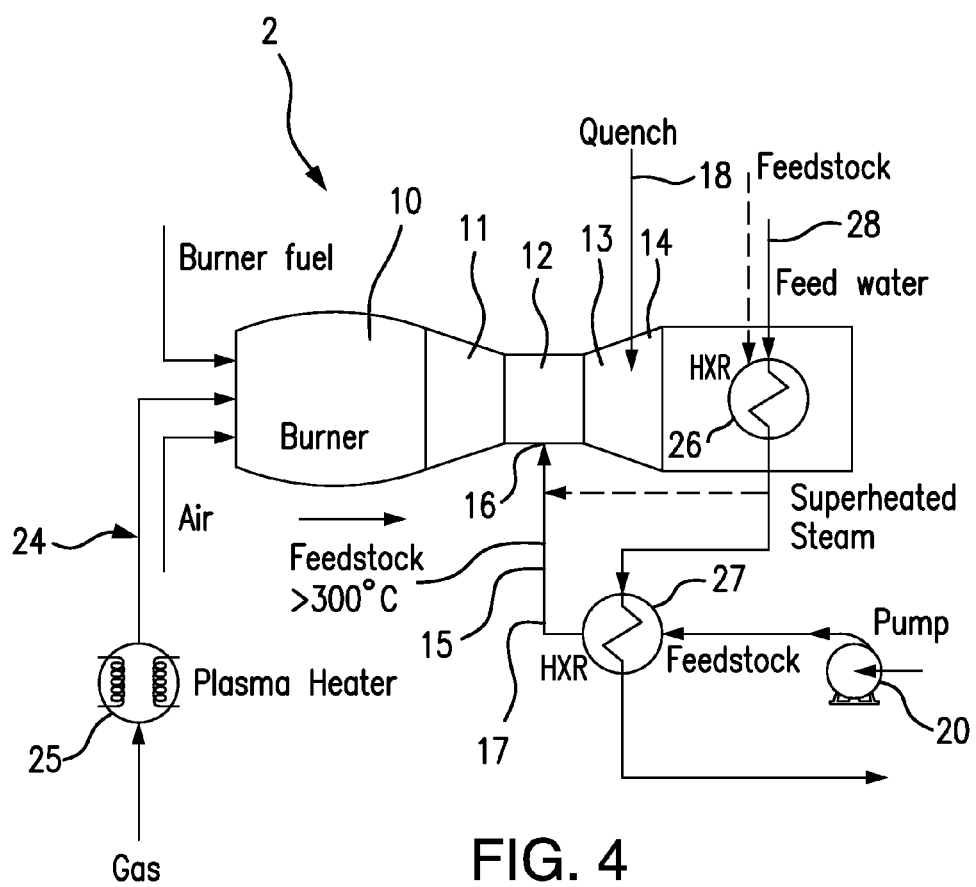
FIG. 4 is a schematic of a portion of an additional type of furnace carbon black reactor which may be utilized in a process of the present invention to produce carbon blacks. This carbon black reactor is only illustrative of the reactors which may be used in the present invention.

FIG. 4 shows another type of furnace carbon black reactor which may be used in a process of the present invention wherein the heated gas stream further includes at least in part or completely a heated gas 24 that has been heated at least in part or completely using a plasma heater 25. Plasma heating of the gas can be accomplished, for example, in accordance with methods known to those skilled in the art. A plasma torch can be used, for example, such as shown in U.S. Pat. No. 5,486,674, the entire disclosure of which is hereby incorporated by reference, and reference can be made to plasma heating shown in U.S. Pat. Nos. 4,101,639 and 3,288,696, the entire disclosures are hereby incorporated by reference.

As also shown in FIG. 4, the feedstock can be indirectly heated by a heat medium (e.g., steam) that has exchanged heat with the reaction stream in heat exchanger 26 in the reactor, or, alternatively, the feedstock can be directly heated in heat exchanger 26 in the reactor as shown by the hatched lines.

The heat exchanger design used for preheating the feedstock, in or outside the reactor, in these various process schemes of the present invention may have any conventional heat exchanger design, such as shell and tube, shell and coil, plate and frame, and the like. Where the heat exchanger has an inline coil configuration, schedule 80 pipe and elbows can be used, for example, for the inline coil to prevent corrosion/erosion problems. Also, a constant pitch between tubes can be used in constructing the inline coil piping and the coil can use the entire cross section of the flue gas header. Heat transfer coefficients for inline coils may vary significantly for different grades and different plants.

Also, any of the feedstocks for the described process schemes and methods can contain additional materials or compositions which are commonly used to make conventional carbon black. The method of the present invention can further include introducing at least one substance that is or that contains at least one Group IA and/or Group IIA element (or ion thereof) of the Periodic Table. The substance containing at least one Group IA and/or Group IIA element (or ion thereof) contains at least one alkali metal or alkaline earth metal. Examples include lithium, sodium, potassium, rubidium, cesium, francium, calcium, barium, strontium, or radium, or combinations thereof. Any mixtures of one or more of these components can be present in the substance. The substance can be a solid, solution, dispersion, gas, or any combinations thereof. More than one substance having the same or different Group IA and/or Group IIA metal (or ion thereof) can be used. If multiple substances are used, the substances can be added together, separately, sequentially, or in different reaction locations. For purposes of the present invention, the substance can be the metal (or metal ion) itself, a compound containing one or more of these elements, including a salt containing one or more of these elements, and the like. The substance can be capable of introducing a metal or metal ion into the reaction that is ongoing to form the carbon black product. For purposes of the present invention, the substance containing at least one Group IA and/or IIA metal (or ion thereof), if used, can be introduced at any point in the reactor, for example, prior to the complete quenching. For instance, the substance can be added at any point prior to the complete quenching, including prior to the introduction of the carbon black yielding feedstock in a first reaction stage; during the introduction of the carbon black yielding feedstock in a first reaction stage; after the introduction of the carbon black yielding feedstock in a first reaction stage; prior to, during, or immediately after the introduction of any second carbon black yielding feedstock; or any step after the introduction of a second carbon black yielding feedstock but prior to the complete quenching. More than one point of introduction of the substance can be used.

The amount of the Group IA and/or Group IIA metal (or ion thereof) containing substance, if used, can be any amount as long as a carbon black product can be formed. The substances can be added in an amount such that 200 ppm or more of the Group IA element or ion and/or Group IIA element (or ion thereof) is present in the carbon black product ultimately formed. Other amounts include from about 200 ppm to about 20000 ppm or more and other ranges can be from about 500 ppm to about 20000 ppm, or from about 1000 ppm to about 20000 ppm, or from about 5000 ppm to about 20000 ppm, or from about 10000 ppm to about 20000 ppm, or from about 300 ppm to about 5000 ppm, or from about 500 ppm to about 3000 ppm, or from about 750 ppm to about 1500 ppm, of the Group IA and/or Group IIA element (or ion thereof) present in the carbon black product that is formed. These levels can be with respect to the metal ion concentration. These amounts of the Group IA and/or Group IIA element (or ion thereof) present in the carbon black product that is formed can be with respect to one element or more than one Group IA and/or Group IIA element (or ion thereof) and would be therefore a combined amount of the Group IA and/or Group IIA elements (or ions thereof) present in the carbon black product that is formed. Therefore, these amounts can apply to Group IA element/ion or Group IIA element/ion content alone. The substance can be added in any fashion. The substance can be added in the same manner that a carbon black yielding feedstock is introduced. The substance can be added as a gas, liquid, or solid, or any combination thereof. The substance can be added at one point or several points and can be added as a single stream or a plurality of streams. The substance can be mixed in with the feedstock, fuel, and/or oxidant prior to or during their introduction.

One method by which a substance containing at least one Group IA and/or Group IIA element (or ion thereof) such as, for example, potassium can be introduced into the feedstock is by the incorporation of the substance into the feedstock. In another method, the substance is introduced into the reactor separately from the feedstock, such as by use of an injection wand that extends into the reactor. Addition of potassium solution to high temperature feedstock, for example, may create a risk of tip plugging, such as resulting from potassium flashing. Injection of potassium ions or other Group IA and/or IIA metals (or ions thereof) with a wand in the burner can be used to mitigate that risk. Also, the use of a wand for introducing potassium other Group IA and/or IIA metals (or ions thereof) in the reactor which has larger openings than standard openings can be used to reduce plugging risk or provide for cleaning of a wand while on load. To reduce risk of burner liner damage when making high potassium ion grades of carbon black, the feedstock temperature may need to be reduced to a lower value still in the range >300° C., so that the potassium ions can be injected into the oil. For >300° C. feedstock preheat, an alternative oil soluble form of potassium can be used, such as CATALYST® 460 HF material from OM Group, which may be injected directly into the feedstock. CATALYST® 460 HF material is an organic salt of potassium (potassium neodecanoate), which is soluble in feedstock, thus it should not be subject to the same risk of flashing problems as with aqueous solutions. Accordingly, process schemes of the present invention based on combined high temperature feedstock and antifouling strategies can be adapted to be compatible with use of in-process carbon black modifiers, such as structure control additives (e.g., potassium or other alkali metal/ion sources).

The feedstock preheating conditions and designs made feasible by the present invention can provide advantages and benefits, such as, for example, improved energy recovery, savings in raw material costs, increases in carbon black, reduction of carbon dioxide emissions, stable or continuous carbon black production for industrially useful durations of time at high feedstock temperature conditions, or any combinations thereof. Increased feedstock preheat to greater than 300° C. can be expected to reduce the emission levels of sulfur and NOx on a mass rate basis under constant production conditions. The emissions rate per kg of carbon black is expected to decrease under all operating conditions. The emissions concentration will be dependent on the particular operating conditions chosen.

In addition to the previously indicated benefits and advantages, other potential benefits of feedstock preheat can be realized according to the present invention. A yield increase mechanism can result from pre-forming seeds in the pyrolysis process. While not desiring to be bound to a particular theory, the feedstock may undergo dehydrogenation reactions of polyaromatic hydrocarbons (PAH) and abstraction of non-aromatic groups during the preheat stage. Dehydrogenated PAHs are expected to form seeds faster than the original material. High pressure has been shown in the examples to control the rate of dehydrogenation. Pressure, residence time, and/or temperature control as detailed herein can control the formation of large PAH molecules, which potentially could provide a control mechanism for production of carbon black seeds. As indicated, the downside of a high temperature feedstock pyrolysis is the potential for coking and grit formation, which are mitigated or prevented in the present invention where the high feedstock temperature conditions are combined with the fouling control approaches in place. A second mechanism of yield increase can be, for example, by flash evaporation of the preheated feedstock in the carbon black reactor without cooling the surrounding gas. Flash evaporation of the feedstock would obviate a necessity to use burner flue gas for feedstock atomization. When injected into near atmospheric pressure in the carbon black reactor, the preheated feedstock to temperatures exceeding 300° C. may have sufficient internal energy to self-evaporate and mix with burner flue gases.

Any type of ASTM grade (e.g., N100 to N1000) or other grades of carbon black can be made by the present invention. The carbon black made by the processes of the present invention can have one or more unique properties (or beneficial properties) and/or parameters due to using high preheat feedstock temperatures and/or other process parameters mentioned herein. The carbon black made by the methods and equipment arrangements of the present invention can be used in any end use application where conventional carbon blacks are used, e.g., inks, pigments, plastic products, sealants, adhesives, coatings, elastomeric products, toners, fuel cells, tires or parts thereof, molded parts, electronic components, cables, wires, or parts thereof, and the like, using conventional amounts or lower.

With the present invention, one advantage that can be achieved is the formation of commercially-acceptable carbon blacks having the same morphology and/or other parameters as carbon black made in a conventional manner. With the present invention, commercially-acceptable carbon blacks having the same morphology and/or other parameters are capable of being made using the processes of the present invention. As an option, one advantage that can be achieved with the present invention is the formation of carbon blacks which have a much lower PAH amount. A lower PAH amount in carbon blacks does not alter the performance of the carbon black and generally a high PAH amount is undesired for a variety of reasons. With the present invention, a selected carbon black can be made having the same morphology or essentially the same morphology (i.e., a morphology value within plus or minus 5% variation in one or more morphology properties such as OAN, COAN, and the like) as the selected carbon black made by a conventional method using the same reactor conditions and feedstock (but wherein no preheating occurs of the feedstock to temperatures of greater than 300° C. prior to supplying the feedstock to a carbon black reactor). The PAH levels of a selected carbon black of the present invention can be reduced, on a ppm weight basis, from 10% to 50%, from 20% to 50%, or 30% to 100% or more based on ppm levels, when compared to the selected carbon black having the same morphology, but prepared where no preheating of the carbon black yielding feedstock to greater than 300° C. occurs prior to entry into the carbon black reactor to form carbon black and using the same reactor conditions and feedstock. Further, PAH levels in carbon black can be separated into three molecular weight (MW) categories: high MW PAHs (greater than 250 weight-average MW); medium MW PAHs (200 to 250 weight-average MW); and low MW PAHs (less than 250 weight-average MW). The present invention has the ability to reduce one or more of the high MW and/or medium MW PAH amounts from 10% to 50%, from 20% to 50%, or from 30% to 100% or more based on ppm levels, when compared to a carbon black having the same morphology, but prepared where no preheating of the carbon black yielding feedstock to greater than 300° C. occurs prior to entry into the carbon black reactor to form carbon black and using the same reactor conditions and feedstock. Moreover, the present invention has the ability to greatly reduce the percentage of high MW PAHs (considered the most undesirable) from the total PAH amount of a selected carbon black, when compared to the selected carbon black having the same morphology, but prepared where no preheating of the carbon black yielding feedstock to greater than 300° C. occurs prior to entry into the carbon black reactor to form carbon black and using the same reactor conditions and feedstock. The percentage of high MW PAHs from the total PAH amount can be reduced by amounts from 10% to 50%, from 20% to 50%, or from 30% to 100% or more based on ppm levels for a selected carbon black, when compared to the selected carbon black having the same morphology, but prepared where no preheating of the carbon black yielding feedstock to greater than 300° C. occurs prior to entry into the carbon black reactor to form carbon black and using the same reactor conditions and feedstock. The above determinations were made based on experiments which compared selected carbon blacks made using the present invention compared to the selected carbon blacks made where no preheating of the carbon black yielding feedstock to greater than 300° C. occurs prior to entry into the carbon black reactor to form carbon black, but otherwise using the same reactor conditions and feedstock. This is a significant advantage achievable with the present invention.

The present invention includes the following aspects/embodiments/features in any order and/or in any combination:

1. The present invention relates to a method for producing carbon black comprising:
  introducing a heated gas stream into a carbon black reactor;
  supplying at least one carbon black-yielding feedstock to at least one heater;
  preheating said at least one carbon black-yielding feedstock in said at least one heater to a second temperature of greater than about 300° C. to provide a preheated carbon black-yielding feedstock, wherein (a) the at least one carbon black-yielding feedstock has a velocity in said at least one heater that is at least 0.2 m/sec, and the velocity is calculated based on a feedstock density measured at 60° C. at 1 atm and the smallest cross-sectional area of a feedstock line present in said at least one heater, and (b) the at least one carbon black-yielding feedstock has a first feedstock residence time in said heater of less than about 120 minutes;
  supplying said preheated carbon black-yielding feedstock to at least one feedstock introduction point to the carbon black reactor, wherein said preheated carbon black-yielding feedstock has a second feedstock residence time of from exiting said at least one heater to right before the introduction point to said carbon black reactor of less than about 120 minutes; and wherein said first feedstock residence time and said second feedstock residence time combined are 120 minutes or less;
  combining at least said preheated carbon black-yielding feedstock through the at least one introduction point to said carbon black reactor with the heated gas stream to form a reaction stream in which carbon black is formed in said carbon black reactor; and
  recovering (e.g., quenching) the carbon black in the reaction stream.

2. The method of any preceding or following embodiment/feature/aspect, further comprising pressurizing said carbon black-yielding feedstock to have a pressure greater than about 10 bar prior to entering said at least one heater.

3. The method of any preceding or following embodiment/feature/aspect, further comprising pressurizing said carbon black-yielding feedstock to have a pressure of greater than about 20 bar prior to entering said at least one heater.

4. The method of any preceding or following embodiment/feature/aspect, further comprising pressurizing said carbon black-yielding feedstock to a pressure of from about 20 bar to about 180 bar prior to entering said at least one heater.

5. The method of any preceding or following embodiment/feature/aspect, wherein said velocity is at least about 1 m/sec.

6. The method of any preceding or following embodiment/feature/aspect, wherein said velocity of at least about 1.6 m/sec.

7. The method of any preceding or following embodiment/feature/aspect, wherein said carbon black-yielding feedstock comprises decant oil, coal tar product, ethylene cracker residues, asphaltene containing oil, or any combination thereof.

8. The method of any preceding or following embodiment/feature/aspect, wherein said carbon black-yielding feedstock has an initial boiling point of from about 160° C. to about 500° C.

9. The method of any preceding or following embodiment/feature/aspect, wherein said preheating of the at least one carbon black-yielding feedstock comprises heating said carbon-black-yielding feedstock in said heater that has a heat exchanger operating at an average heat flux of greater than about 10 kW/m$^2$.

10. The method of any preceding or following embodiment/feature/aspect, wherein at least a portion of said preheating occurs in said at least one heater that has heat at least partially provided by heat generated by said carbon black reactor or other carbon black reactor or both.

11. The method of any preceding or following embodiment/feature/aspect, wherein said first residence time and said second residence time combined are less than 60 minutes.

12. The method of any preceding or following embodiment/feature/aspect, wherein said at least one heater is in heat exchange with at least a portion of said carbon black reactor.

13. The method of any preceding or following embodiment/feature/aspect, wherein said at least one heater contacts said reaction stream in said carbon black reactor downstream of a quencher, wherein said at least one heater comprises a heat exchanger having walls heated by said reaction stream on a first side thereof and contacting said carbon black-yielding feedstock on an opposite side thereof.

14. The method of any preceding or following embodiment/feature/aspect, wherein said at least one heater includes a heat exchanger that heat exchanges with said reaction stream in said carbon black reactor, wherein a flowable heat carrier that flows through the heat exchanger is heated, and the heated flowable heat carrier passes through said at least one heater positioned external to the reactor and operable to exchange heat of the flowable heat carrier with the feedstock to heat said carbon black-yielding feedstock.

15. The method of any preceding or following embodiment/feature/aspect, wherein said at least one heater is at least partially heat sourced with carbon black tail gas from said carbon black reactor or a different carbon black reactor or both, to heat the carbon black-yielding feedstock.

16. The method of any preceding or following embodiment/feature/aspect, wherein the introducing of the heated gas stream comprises plasma heating a plasma-heatable gas stream in a plasma heater to provide at least a portion of the heated gas stream.

17. The method of any preceding or following embodiment/feature/aspect, further comprising providing a non-catalytic surface on carbon black-yielding feedstock contacting walls of said at least one heater and inner walls of at least one feedstock supply line that supplies said preheated carbon black-yielding feedstock to said carbon black reactor, wherein the surface is non-catalytic to cracking or polymerization of hydrocarbons.

18. The method of any preceding or following embodiment/feature/aspect, wherein said supplying comprises feeding said preheated carbon black-yielding feedstock through at least one feedstock supply line that supplies to said carbon black reactor, and said method further comprises periodically feeding a purge gas comprising an oxidant for carbon through the at least one carbon black-yielding feedstock supply line.

19. The method of any preceding or following embodiment/feature/aspect, wherein said supplying comprises feeding said preheated carbon black-yielding feedstock through at least one feedstock supply line that supplies to said carbon black reactor, and said method further comprises injecting the preheated carbon black yielding feedstock into the carbon black reactor with at least partially flashing of the carbon black-yielding feedstock.

20. The method of any preceding or following embodiment/feature/aspect, further comprising combining the preheated carbon black-yielding feedstock and the heated gas stream in the carbon black reactor to continuously form carbon black in the reactor for at least about 12 hours.

21. A method for producing carbon black comprising:
introducing a heated gas stream into a carbon black reactor;
supplying at least one carbon black-yielding feedstock having a first temperature of below 360° C. to at least one heater;
preheating said at least one carbon black-yielding feedstock in said at least one heater to a second temperature of from about 360° C. to about 850° C. to provide a preheated carbon black-yielding feedstock, wherein (a) the at least one carbon black-yielding feedstock has a velocity in said at least one heater that is at least 0.2 m/sec, and the velocity is calculated based on a feedstock density measured at 60° C. at 1 atm and the smallest cross-sectional area of a feedstock line present in said at least one heater, and (b) the at least one carbon black-yielding feedstock has a first feedstock residence time in said heater of less than about 120 minutes;
supplying said preheated carbon black-yielding feedstock to at least one feedstock introduction point to the carbon black reactor, wherein said preheated carbon black-yielding feedstock has a second feedstock residence time of from exiting said at least one heater to right before the introduction point to said carbon black reactor of less than about 120 minutes; and wherein said first feedstock residence time and said second feedstock residence time combined are from about 10 seconds to about 120 minutes;
combining at least said preheated carbon black-yielding feedstock through the at least one introduction point to said carbon black reactor with the heated gas stream to form a reaction stream in which carbon black is formed in said carbon black reactor; and
recovering (e.g., quenching) the carbon black in the reaction stream.

22. The method of any preceding or following embodiment/feature/aspect, further comprising pressurizing said carbon black-yielding feedstock to have a pressure greater than about 20 bar prior to entering said at least one heater.

23. The method of any preceding or following embodiment/feature/aspect, further comprising pressurizing said carbon black-yielding feedstock to have a pressure of greater than about 30 bar prior to entering said at least one heater.

24. The method of any preceding or following embodiment/feature/aspect, further comprising pressurizing said carbon black-yielding feedstock to a pressure of from about 30 bar to about 180 bar prior to entering said at least one heater.

25. The method of any preceding or following embodiment/feature/aspect, wherein said velocity is at least about 1 m/sec.

26. The method of any preceding or following embodiment/feature/aspect, wherein said velocity of at least about 1.6 m/sec.

27. The method of any preceding or following embodiment/feature/aspect, wherein said carbon black-yielding feedstock comprises decant oil, coal tar product, ethylene cracker residues, asphaltene containing oil, or any combination thereof.

28. The method of any preceding or following embodiment/feature/aspect, wherein said carbon black-yielding feedstock has an initial boiling point of from about 160° C. to about 500° C.

29. The method of any preceding or following embodiment/feature/aspect, wherein said preheating of the at least one carbon black-yielding feedstock comprises heating said carbon-black-yielding feedstock in said heater that has a heat exchanger operating at an average heat flux of greater than about 20 kW/m$^2$.

30. The method of any preceding or following embodiment/feature/aspect, wherein at least a portion of said preheating occurs in said at least one heater that has heat at least partially provided by heat generated by said carbon black reactor or other carbon black reactor or both.

31. The method of any preceding or following embodiment/feature/aspect, wherein said first residence time and said second residence time combined are less than 60 minutes.

32. The method of any preceding or following embodiment/feature/aspect, wherein said at least one heater is in heat exchange with at least a portion of said carbon black reactor.

33. The method of any preceding or following embodiment/feature/aspect, wherein said at least one heater contacts said reaction stream in said carbon black reactor downstream of a quencher, wherein said at least one heater comprises a heat exchanger having walls heated by said reaction stream on a first side thereof and contacting said carbon black-yielding feedstock on an opposite side thereof before said carbon black-yielding feedstock.

34. The method of any preceding or following embodiment/feature/aspect, wherein said at least one heater includes a heat exchanger that heat exchanges with said reaction stream in said carbon black reactor, wherein a flowable heat carrier that flows through the heat exchanger is heated, and the heated flowable heat carrier passes through said at least one heater positioned external to the reactor and operable to exchange heat of the flowable heat carrier with the feedstock to heat said carbon black-yielding feedstock.

35. The method of any preceding or following embodiment/feature/aspect, wherein said at least one heater is at least partially heat sourced with carbon black tail gas from said carbon black reactor or a different carbon black reactor or both, to heat the carbon black-yielding feedstock.

36. The method of any preceding or following embodiment/feature/aspect, wherein the introducing of the heated gas stream comprises plasma heating a plasma-heatable gas stream in a plasma heater to provide at least a portion of the heated gas stream.

37. The method of any preceding or following embodiment/feature/aspect, further comprising providing a non-catalytic surface on carbon black-yielding feedstock contacting walls of said at least one heater and inner walls of at least one feedstock supply line that supplies said preheated carbon black-yielding feedstock to said carbon black reactor, wherein the surface is non-catalytic to cracking or polymerization of hydrocarbons.

38. The method of any preceding or following embodiment/feature/aspect, wherein said supplying comprises feeding said preheated carbon black-yielding feedstock through at least one feedstock supply line that supplies to said carbon black reactor, and said method further comprises periodically feeding a purge gas comprising an oxidant for carbon through the at least one carbon black-yielding feedstock supply line.

39. The method of any preceding or following embodiment/feature/aspect, wherein said supplying comprises feeding said preheated carbon black-yielding feedstock through at least one feedstock supply line that supplies to said carbon black reactor, and said method further comprises injecting the preheated carbon black yielding feedstock into the carbon black reactor with at least partially flashing of the carbon black-yielding feedstock.

40. The method of any preceding or following embodiment/feature/aspect, further comprising combining the preheated carbon black-yielding feedstock and the heated gas stream in the carbon black reactor to continuously form carbon black in the reactor for at least about 12 hours.

41. A method for producing carbon black comprising:
introducing a heated gas stream into a carbon black reactor;
supplying at least one carbon black-yielding feedstock having a first temperature of below 450° C. to at least one heater;
preheating said at least one carbon black-yielding feedstock in said at least one heater to a second temperature of greater than about 450° C. to provide a preheated carbon black-yielding feedstock, wherein (a) the at least one carbon black-yielding feedstock has a velocity in said at least one heater that is at least 0.2 m/sec, and the velocity is calculated based on a feedstock density measured at 60° C. at 1 atm and the smallest cross-sectional area of a feedstock line present in said at least one heater, and (b) the at least one carbon black-yielding feedstock has a first feedstock residence time in said heater of from 10 seconds to about 120 minutes;
supplying said preheated carbon black-yielding feedstock to at least one feedstock introduction point to the carbon black reactor, wherein said preheated carbon black-yielding feedstock has a second feedstock residence time of from exiting said at least one heater to right before the introduction point to said carbon black reactor of less than about 120 minutes; and wherein said first feedstock residence time and said second feedstock residence time combined are 120 minutes or less;
combining at least said preheated carbon black-yielding feedstock through the at least one introduction point to said carbon black reactor with the heated gas stream to form a reaction stream in which carbon black is formed in said carbon black reactor; and
recovering (e.g., quenching) the carbon black in the reaction stream.

42. The method of any preceding or following embodiment/feature/aspect, further comprising pressurizing said carbon black-yielding feedstock to have a pressure of from about 20 bar to about 180 bar prior to entering said at least one heater.

43. The method of any preceding or following embodiment/feature/aspect, further comprising pressurizing said carbon black-yielding feedstock to have a pressure of from about 30 bar to about 180 bar prior to entering said at least one heater.

44. The method of any preceding or following embodiment/feature/aspect, further comprising pressurizing said carbon black-yielding feedstock to a pressure of from about 40 bar to about 180 bar prior to entering said at least one heater.

45. The method of any preceding or following embodiment/feature/aspect, wherein said velocity is at least about 1 m/sec.

46. The method of any preceding or following embodiment/feature/aspect, wherein said velocity of at least about 1.6 m/sec.

47. The method of any preceding or following embodiment/feature/aspect, wherein said carbon black-yielding feedstock comprises decant oil, coal tar product, ethylene cracker residues, asphaltene containing oil, or any combination thereof.

48. The method of any preceding or following embodiment/feature/aspect, wherein said carbon black-yielding feedstock has an initial boiling point of from about 160° C. to about 500° C.

49. The method of any preceding or following embodiment/feature/aspect, wherein said preheating of the at least one carbon black-yielding feedstock comprises heating said carbon-black-yielding feedstock in said heater that has a heat exchanger operating at an average heat flux of from about 20 $kW/m^2$ to about 150 $kW/m^2$.

50. The method of any preceding or following embodiment/feature/aspect, wherein at least a portion of said preheating occurs in said at least one heater that has heat at least partially provided by heat generated by said carbon black reactor or other carbon black reactor or both.

51. The method of any preceding or following embodiment/feature/aspect, wherein said first residence time and said second residence time combined are less than 60 minutes.

52. The method of any preceding or following embodiment/feature/aspect, wherein said at least one heater is in heat exchange with at least a portion of said carbon black reactor.

53. The method of any preceding or following embodiment/feature/aspect, wherein said at least one heater contacts said reaction stream in said carbon black reactor downstream of a quencher, wherein said at least one heater comprises a heat exchanger having walls heated by said reaction stream on a first side thereof and contacting said carbon black-yielding feedstock on an opposite side thereof before said carbon black-yielding feedstock.

54. The method of any preceding or following embodiment/feature/aspect, wherein said at least one heater includes a heat exchanger that heat exchanges with said reaction stream in said carbon black reactor, wherein a flowable heat carrier that flows through the heat exchanger is heated, and the heated flowable heat carrier passes through said at least one heater positioned external to the reactor and operable to exchange heat of the flowable heat carrier with the feedstock to heat said carbon black-yielding feedstock.

55. The method of any preceding or following embodiment/feature/aspect, wherein said at least one heater is at least partially heat sourced with carbon black tail gas from said carbon black reactor or a different carbon black reactor or both, to heat the carbon black-yielding feedstock.

56. The method of any preceding or following embodiment/feature/aspect, wherein the introducing of the heated gas stream comprises plasma heating a plasma-heatable gas stream in a plasma heater to provide at least a portion of the heated gas stream.

57. The method of any preceding or following embodiment/feature/aspect, further comprising providing a non-catalytic surface on carbon black-yielding feedstock contacting walls of said at least one heater and inner walls of at least one feedstock supply line that supplies said preheated carbon black-yielding feedstock to said carbon black reactor, wherein the surface is non-catalytic to cracking or polymerization of hydrocarbons.

58. The method of any preceding or following embodiment/feature/aspect, wherein said supplying comprises feeding said preheated carbon black-yielding feedstock through at least one feedstock supply line that supplies to said carbon black reactor, and said method further comprises periodically feeding a purge gas comprising an oxidant for carbon through the at least one carbon black-yielding feedstock supply line.

59. The method of any preceding or following embodiment/feature/aspect, wherein said supplying comprises feeding said preheated carbon black-yielding feedstock through at least one feedstock supply line that supplies to said carbon black reactor, and said method further comprises injecting the preheated carbon black yielding feedstock into the carbon black reactor with at least partially flashing of the carbon black-yielding feedstock.

60. The method of any preceding or following embodiment/feature/aspect, further comprising combining the preheated carbon black-yielding feedstock and the heated gas stream in the carbon black reactor to continuously form carbon black in the reactor for at least about 12 hours.

61. A method for producing carbon black comprising:
introducing a heated gas stream into a carbon black reactor;
supplying at least one carbon black-yielding feedstock having a first temperature of below 300° C. to at least one heater at a first pressure of greater than 10 bar;
preheating said at least one carbon black-yielding feedstock in said at least one heater to a second temperature of greater than about 300° C. to provide a preheated carbon black-yielding feedstock, wherein (a) the at least one carbon black-yielding feedstock has a second pressure in said at least one heater that is about the same or lower than said first pressure, as calculated based on assuming same cross-sectional area that feedstock travels in during first pressure and second pressure and (b) the at least one carbon black-yielding feedstock has a first feedstock residence time in said heater of less than about 120 minutes;
supplying said preheated carbon black-yielding feedstock to at least one feedstock introduction point to the carbon black reactor, wherein said preheated carbon black-yielding feedstock has a second feedstock residence time of from exiting said at least one heater to right before the introduction point to said carbon black reactor of less than about 120 minutes; and wherein said first feedstock residence time and said second feedstock residence time combined are 120 minutes or less;
combining at least said preheated carbon black-yielding feedstock through the at least one introduction point to said carbon black reactor with the heated gas stream to form a reaction stream in which carbon black is formed in said carbon black reactor; and
recovering (e.g., quenching) the carbon black in the reaction stream.

62. A method for producing carbon black comprising:
introducing a heated gas stream into a carbon black reactor;
supplying at least one carbon black-yielding feedstock having a first temperature of below 300° C. to at least one heater at a first pressure of greater than 10 bar;
preheating said at least one carbon black-yielding feedstock in said at least one heater to a second temperature of greater than about 300° C. to provide a preheated carbon black-yielding feedstock, wherein the at least one carbon black-yielding feedstock has i) a second pressure in said at least one heater that is about the same or lower than said first pressure and ii) the at least one carbon black-yielding feedstock has a velocity in said at least one heater that is at least 0.2 m/sec, and the velocity is calculated based on a feedstock density measured at 60° C. at 1 atm and the smallest cross-sectional area of a feedstock line present in said at least one heater, and wherein i) is calculated based on same cross-sectional area that feedstock travels in during first pressure and second pressure; and
supplying said preheated carbon black-yielding feedstock to at least one feedstock introduction point to the carbon black reactor;
combining at least said preheated carbon black-yielding feedstock through the at least one introduction point to said carbon black reactor with the heated gas stream to form a reaction stream in which carbon black is formed in said carbon black reactor; and
recovering (e.g., quenching) the carbon black in the reaction stream.

63. An apparatus for producing carbon black comprising:
a reactor for combining a heated gas stream and at least one carbon black-yielding feedstock to form a reaction stream in which carbon black is formed in the reactor;
at least one feedstock supply line for supplying the carbon black-yielding feedstock to at least one feedstock introduction point to the reactor to combine the feedstock with the heated gas stream;
at least one feedstock heater operable to preheat the carbon black-yielding feedstock supplied in the at least one feedstock supply line to a temperature of at least about 300° C.;
at least one pump operable to pressurize the carbon black-yielding feedstock to a pressure greater than about 10 bar before the feedstock is preheated to at least about 300° C. and for providing a feedstock velocity of the feedstock supplied in the at least one feedstock heater of at least 0.2 m/sec, wherein velocity is calculated based on a feedstock density measured at 60° C. at 1 atm and the smallest cross-sectional area of a feedstock line present in said at least one heater; and
optionally, a quencher for cooling the carbon black in the reaction stream;
wherein said apparatus is further operable to provide a feedstock residence time in the at least one feedstock heater and the at least one feedstock supply line before introduction to the reactor for the feedstock preheated to at least about 300° C. that is less than about 120 minutes.

64. The apparatus of any preceding or following embodiment/feature/aspect, wherein the at least one feedstock heater comprises a heat exchanger operable to heat the carbon black-yielding feedstock at an average heat flux of greater than about 10 kW/m².

65. The apparatus of any preceding or following embodiment/feature/aspect, wherein the at least one feedstock heater is positioned within the reactor to be contactable by the reaction stream operable to heat the feedstock to a temperature of at least 300° C.

66. The apparatus of any preceding or following embodiment/feature/aspect, wherein the at least one feedstock heater is positioned in contact with at least a portion of the reactor operable to heat the feedstock to a temperature of at least 300° C.

67. The apparatus of any preceding or following embodiment/feature/aspect, wherein the at least one feedstock heater comprises a heat exchanger positioned within the reactor downstream of the quencher, wherein said heat exchanger comprises walls adapted to be heated by the reaction stream on a first side thereof and adapted to be contacted by feedstock on an opposite side thereof before the feedstock is supplied to the at least one feedstock supply line, wherein the feedstock is heatable to a temperature of at least 300° C. in the heat exchanger.

68. The apparatus of any preceding or following embodiment/feature/aspect, further comprising a heat exchanger for a flowable heat carrier positioned within the reactor to be contactable by the reaction stream, and the at least one feedstock heater is external to the reactor and operable to exchange heat of the flowable heat carrier that has exited the heat exchanger with the feedstock in the feedstock heater to heat the feedstock to a temperature of at least 300° C.

69. The apparatus of any preceding or following embodiment/feature/aspect, wherein the at least one feedstock heater is operable to exchange heat from a tail gas stream of the reactor to heat the feedstock to a temperature of at least 300° C.

70. The apparatus of any preceding or following embodiment/feature/aspect, further comprising a plasma heater operable for heating a plasma-heatable gas stream for providing at least a portion of the heated gas stream.

71. The apparatus of any preceding or following embodiment/feature/aspect, further comprising non-catalytic surface on feedstock contacting walls of the feedstock heater and feedstock contacting inner walls of the at least one feedstock supply line, wherein the surface is non-catalytic to cracking or polymerization of hydrocarbons.

72. The apparatus of any preceding or following embodiment/feature/aspect, further comprising non-catalytic ceramic lining on feedstock contacting walls of the feedstock heater and feedstock contacting inner walls of the at least one feedstock supply line.

73. The apparatus of any preceding or following embodiment/feature/aspect, further comprising at least one source of purge gas comprising an oxidant for carbon and at least one purge gas introduction point on the at least one feedstock supply line operable to periodically purge the at least one feedstock supply line with the purge gas.

74. The apparatus of any preceding or following embodiment/feature/aspect, wherein said reactor is operable to combine feedstock and heated gas stream to continuously form carbon black in the reactor for at least about 12 hours.

75. The method of any preceding or following embodiment/feature/aspect, wherein said preheating avoids formation of vapor film in said at least one heater and/or prior to said supplying to said carbon black reactor.

76. The method of any preceding or following embodiment/feature/aspect, wherein said preheating and/or said supplying is in the absence of a runaway pressure drop based on steady state operating conditions.

77. Carbon black formed by the method of any preceding or following embodiment/feature/aspect.

78. The carbon black of any preceding or following embodiment/feature/aspect, wherein said carbon black has a PAH amount of at least 10% less PAH compared to a carbon black having the same morphology made in a method with no preheating of the feedstock.

79. The carbon black of any preceding or following embodiment/feature/aspect, wherein said carbon black has a percentage of high MW PAH amount based on total PAH amount of at least 10% less compared to a carbon black having the same morphology made in a method without said preheating.

80. A method for producing carbon black comprising:
introducing a heated gas stream into a carbon black reactor;
supplying at least one carbon black-yielding feedstock to at least one heater;
preheating said at least one carbon black-yielding feedstock in said at least one heater to a second temperature of greater than about 300° C. to provide a preheated carbon black-yielding feedstock, wherein (a) the at least one carbon black-yielding feedstock has a velocity in said at least one heater that is at least 0.2 m/sec, and the velocity is calculated based on a feedstock density measured at 60° C. at 1 atm and the smallest cross-sectional area of a feedstock line present in said at least one heater, and (b) the at least one carbon black-yielding feedstock has a first feedstock residence time in said heater of less than about 120 minutes;
supplying said preheated carbon black-yielding feedstock to at least one feedstock introduction point to the carbon black reactor, wherein said preheated carbon black-yielding feedstock has a second feedstock residence time of from exiting said at least one heater to right before the introduction point to said carbon black reactor of less than about 120 minutes; and wherein said first feedstock residence time and said second feedstock residence time combined are 120 minutes or less; wherein said preheating is at a sufficient pressure that avoids formation of vapor film in said at least one heater or prior to said supplying to said carbon black reactor;
combining at least said preheated carbon black-yielding feedstock through the at least one introduction point to said carbon black reactor with the heated gas stream to form a reaction stream in which carbon black is formed in said carbon black reactor; and
recovering (e.g., quenching) the carbon black in the reaction stream.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

EXAMPLES

Example 1

Figure 5:
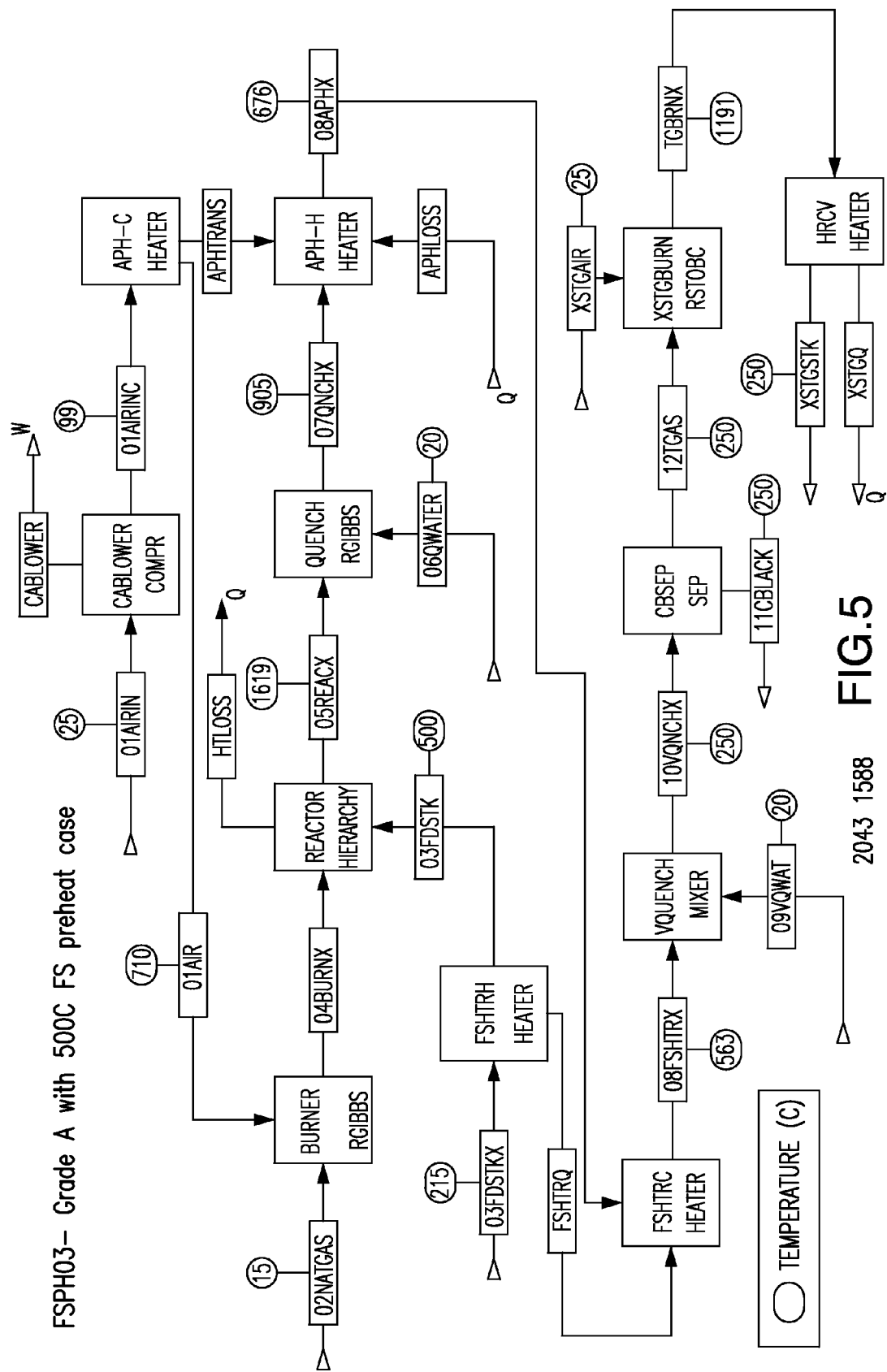
FIG. 5 is a schematic of a process scheme which may be utilized in a process of the present invention to produce carbon blacks. This carbon black reactor scheme is used in the examples, but is only illustrative of the reactors which may be used in the present invention.
Figure 6:
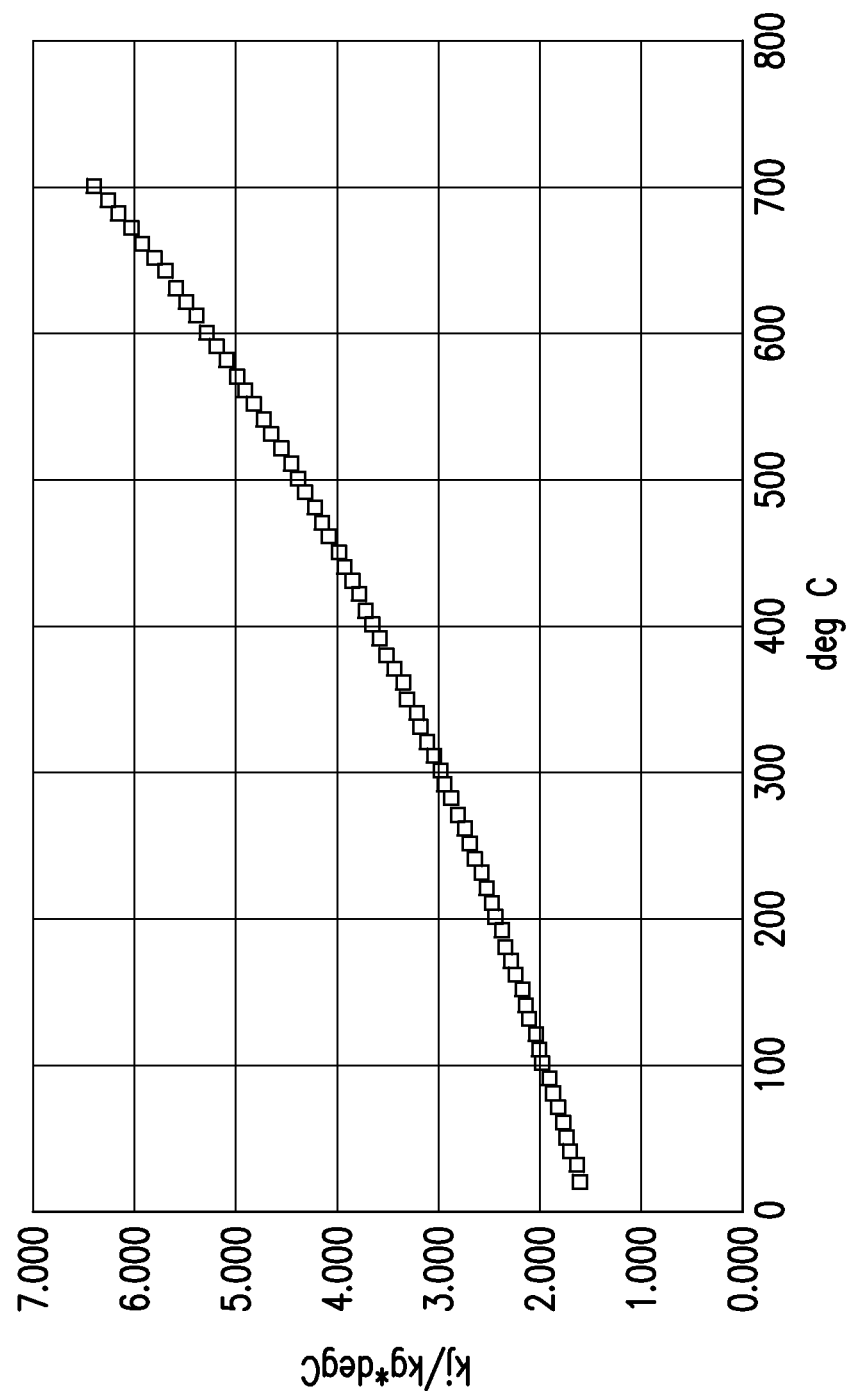
FIG. 6 is a plot of feedstock heat capacity (kJoules/kg·° C.) relative to feedstock temperature (° C.) used for raw material savings calculations in modeling described in the examples.

Computer based modeling was used to estimate raw material cost savings potential for two grades of carbon black (A and B) using feedstock temperatures of 215° C., 500° C., and 700° C. in a carbon black production scheme capable of stable sustained operation at 500° C. and 700° C. by the indicated fouling control approaches of the present invention. Aspen Plus computer modeling program was used for the modeling the process scheme, using methodologies and assumptions for mass and energy balances and reaction chemistries according to industry-acceptable practices. The model process flow diagram used for this modeling is similar to that shown in FIG. 5. FIG. 5 shows the process scheme for Grade A and a feedstock preheat temperature of 500° C., and this general process layout otherwise also applies to the other modeled feedstock temperature and Grade combinations. The process scheme shown in detail in FIG. 5 is generally similar to the process scheme shown in FIG. 1. As shown in FIG. 5, the feedstock is heated using the heat of the carbon black reactor smoke between an initial quench and a secondary quench location. Feedstock heat capacity used in the calculation is shown in FIG. 6. Feedstock was assumed to be unreactive; the effect of endothermicity of pyrolysis reaction is not included into feedstock heat capacity. Two cases with feedstock preheat temperatures of 500° C. and 700° C. were modeled and compared to the baseline cases (215° C. preheat) for Grades A and B.

The liquid carbon-yielding feedstocks applicable to Grades A and B used in the modeling were decant oil and decant oil/coal tar mixture. The Grades A and B liquid feedstocks had the following compositions:

Grade A decant oil:
Higher Heating Value [J/kg]: 39,524,446
Ultimate Analysis [mass %]:
ASH 0
CARBON 88.68
HYDROGEN 6.92
NITROGEN 0.31
CHLORINE 0
SULFUR 3.86
OXYGEN 0.23

Grade B decant oil/coal tar:
Flow Rate [kg/hr]: 3,562
Heat of Formation [J/kg]: 50,692
Higher Heating Value [J/kg]: 39,878,687
Ultimate Analysis [mass %]:
ASH 0
CARBON 88.62
HYDROGEN 7.40
NITROGEN 0.31
CHLORINE 0
SULFUR 3.44
OXYGEN 0.23
Coal tar [mass %]: 30.0

Tables 2-7 show the raw data used for the modeling calculations for each grade of carbon black at each temperature of the preheat temperatures of 500° C. and 700° C. The results of the modeling calculations are also presented in the Tables.

TABLE 2

Energy content of raw materials and carbon black in Aspen Plus calculations

| | |
|---|---|
| Natural Gas: | 53,769,143 J/kg |
| Grade A Feedstock: | 39,878,687 J/kg |
| Grade B Feedstock: | 39,524,446 J/kg |
| Carbon Black: | 32,762,196 J/kg |

TABLE 3

(CB Grade A: Temp. 500° C.)

| FSPH03 Carbon Black A, FS@500 C. | 01AIR | 02NATGAS | 04BURNX | 07QNCHX | 08APHX | 08FSHTRX | 12TGAS |
|---|---|---|---|---|---|---|---|
| Substream: MIXED | | | | | | | |
| Temperature C. | 710 | 15 | | 905 | 676 | 563 | 250 |
| Vapor Frac | 1 | 1 | 1 | 1 | 1 | 1 | 1 |
| Mole Flow kmol/hr | 792 | 60 | 858 | 1,758 | 1,758 | 1,758 | 2,168 |
| Mole Flow scmh | 17,750 | 1,356 | 19,231 | 39,403 | 39,403 | 39,403 | 48,599 |
| Mass Flow kg/hr | 22,934 | 1,018 | 23,952 | 35,795 | 35,795 | 35,795 | 43,186 |
| Enthalpy J/kg | 7.3E+05 | −4.6E+06 | 5.0E+05 | −3.6E+06 | −4.0E+06 | −4.2E+06 | −6.2E+06 |
| Enthalpy J/sec | 4.7E+06 | −1.3E+06 | 3.4E+06 | −3.6E+07 | −4.0E+07 | −4.2E+07 | −7.4E+07 |
| Mole Frac | | | | | | | |
| AR | 0.009 | 0 | 0.009 | 0.004 | 0.004 | 0.004 | 0.003 |
| N2 | 0.781 | 0.004 | 0.717 | 0.353 | 0.353 | 0.353 | 0.286 |
| O2 | 0.21 | 0 | 0.047 | 0 | 0 | 0 | 0 |
| H2 | 0 | 0 | 0.001 | 0.162 | 0.162 | 0.162 | 0.132 |
| H2O | 0 | 0 | 0.137 | 0.366 | 0.366 | 0.366 | 0.486 |
| CO2 | 0 | 0.008 | 0.069 | 0.01 | 0.01 | 0.01 | 0.008 |
| CO | 0 | 0 | 0.004 | 0.101 | 0.101 | 0.101 | 0.082 |
| SO2 | 0 | 0 | 0 | 0 | 0 | 0 | 0 |
| CH4 | 0 | 0.961 | 0 | 0 | 0 | 0 | 0 |
| C2H2 | 0 | 0 | 0 | 0 | 0 | 0 | 0 |
| C2H6 | 0 | 0.021 | 0 | 0 | 0 | 0 | 0 |
| C3H8 | 0 | 0.005 | 0 | 0 | 0 | 0 | 0 |
| N-BUT | 0 | 0.001 | 0 | 0 | 0 | 0 | 0 |
| N-PENT | 0 | 0.001 | 0 | 0 | 0 | 0 | 0 |
| N-HEXANE | 0 | 0 | 0 | 0 | 0 | 0 | 0 |
| HCN | 0 | 0 | 0 | 0 | 0 | 0 | 0 |
| H3N | 0 | 0 | 0 | 0 | 0 | 0 | 0 |
| H2S | 0 | 0 | 0 | 0.004 | 0.004 | 0.004 | 0.003 |
| H | 0 | 0 | 0 | 0 | 0 | 0 | 0 |
| O | 0 | 0 | 0.001 | 0 | 0 | 0 | 0 |

TABLE 3-continued (CB Grade A: Temp. 500° C.)

| FSPH03 Carbon Black A, FS@500 C. | 01AIR | 02NATGAS | 04BURNX | 07QNCHX | 08APHX | 08FSHTRX | 12TGAS |
|---|---|---|---|---|---|---|---|
| OH | 0 | 0 | 0.006 | 0 | 0 | 0 | 0 |
| NO | 0 | 0 | 0.008 | 0 | 0 | 0 | 0 |
| Tail gas HHV, J/kg | | 5.38E+07 | 8.68E+04 | 3.79E+06 | 3.79E+06 | 3.79E+06 | 3.14E+06 |

TABLE 4

(CB Grade A: Temp. 700° C.)

| FSPH04 Carbon Black A, with FS@700 C. | 01AIR | 02NATGAS | 04BURNX | 07QNCHX | 08APHX | 08FSHTRX | 12TGAS |
|---|---|---|---|---|---|---|---|
| Substream: MIXED | | | | | | | |
| Temperature C. | 710 | 15 | | 905 | 720 | 431 | 250 |
| Vapor Frac | 1 | 1 | 1 | 1 | 1 | 1 | 1 |
| Mole Flow kmol/hr | 792 | 60 | 858 | 2,055 | 2,055 | 2,055 | 2,339 |
| Mole Flow scmh | 17,750 | 1,356 | 19,231 | 46,050 | 46,050 | 46,050 | 52,418 |
| Mass Flow kg/hr | 22,934 | 1,018 | 23,952 | 38,960 | 38,960 | 38,960 | 44,078 |
| Enthalpy J/kg | 7.3E+05 | −4.6E+06 | 5.0E+05 | −4.0E+06 | −4.4E+06 | −4.9E+06 | −6.1E+06 |
| Enthalpy J/sec | 4.7E+06 | −1.3E+06 | 3.4E+06 | −4.3E+07 | −4.7E+07 | −5.3E+07 | −7.5E+07 |
| Mole Frac | | | | | | | |
| AR | 0.009 | 0 | 0.009 | 0.004 | 0.004 | 0.004 | 0.003 |
| N2 | 0.781 | 0.004 | 0.717 | 0.302 | 0.302 | 0.302 | 0.265 |
| O2 | 0.21 | 0 | 0.047 | 0 | 0 | 0 | 0 |
| H2 | 0 | 0 | 0.001 | 0.206 | 0.206 | 0.206 | 0.181 |
| H2O | 0 | 0 | 0.137 | 0.385 | 0.385 | 0.385 | 0.46 |
| CO2 | 0 | 0.008 | 0.069 | 0.006 | 0.006 | 0.006 | 0.005 |
| CO | 0 | 0 | 0.004 | 0.093 | 0.093 | 0.093 | 0.082 |
| SO2 | 0 | 0 | 0 | 0 | 0 | 0 | 0 |
| CH4 | 0 | 0.961 | 0 | 0 | 0 | 0 | 0 |
| C2H2 | 0 | 0 | 0 | 0 | 0 | 0 | 0 |
| C2H6 | 0 | 0.021 | 0 | 0 | 0 | 0 | 0 |
| C3H8 | 0 | 0.005 | 0 | 0 | 0 | 0 | 0 |
| N-BUT | 0 | 0.001 | 0 | 0 | 0 | 0 | 0 |
| N-PENT | 0 | 0.001 | 0 | 0 | 0 | 0 | 0 |
| N-HEXANE | 0 | 0 | 0 | 0 | 0 | 0 | 0 |
| HCN | 0 | 0 | 0 | 0 | 0 | 0 | 0 |
| H3N | 0 | 0 | 0 | 0 | 0 | 0 | 0 |
| H2S | 0 | 0 | 0 | 0.004 | 0.004 | 0.004 | 0.004 |
| H | 0 | 0 | 0 | 0 | 0 | 0 | 0 |
| O | 0 | 0 | 0.001 | 0 | 0 | 0 | 0 |
| OH | 0 | 0 | 0.006 | 0 | 0 | 0 | 0 |
| NO | 0 | 0 | 0.008 | 0 | 0 | 0 | 0 |
| Tail gas HHV, J/kg | | 5.38E+07 | 8.68E+04 | 4.62E+06 | 4.62E+06 | 4.62E+06 | 4.08E+06 |

TABLE 5

(CB Grade B: Temp. 500° C.)

| FSPH05 Carbon Black B, FS@500 C. | 01AIR | 02NATGAS | 04BURNX | 07QNCHX | 08APHX | 08FSHTRX | 12TGAS |
|---|---|---|---|---|---|---|---|
| Substream: MIXED | | | | | | | |
| Temperature C. | 760 | 20 | | 907 | 622 | 539 | 250 |
| Vapor Frac | 1 | 1 | 1 | 1 | 1 | 1 | 1 |
| Mole Flow kmol/hr | 608 | 46 | 660 | 1,285 | 1,285 | 1,285 | 1,547 |
| Mole Flow scmh | 13,635 | 1,041 | 14,784 | 28,805 | 28,805 | 28,805 | 34,671 |
| Mass Flow kg/hr | 17,617 | 782 | 18,399 | 27,346 | 27,346 | 27,346 | 32,061 |
| Enthalpy J/kg | 7.9E+05 | −4.6E+06 | 5.6E+05 | −3.7E+06 | −4.2E+06 | −4.4E+06 | −6.0E+06 |
| Enthalpy J/sec | 3.9E+06 | −1.0E+06 | 2.9E+06 | −2.8E+07 | −3.2E+07 | −3.3E+07 | −5.4E+07 |
| Mole Frac | | | | | | | |
| AR | 0.009 | 0 | 0.009 | 0.004 | 0.004 | 0.004 | 0.004 |
| N2 | 0.781 | 0.004 | 0.717 | 0.37 | 0.37 | 0.37 | 0.308 |
| O2 | 0.21 | 0 | 0.047 | 0 | 0 | 0 | 0 |
| H2 | 0 | 0 | 0.002 | 0.121 | 0.121 | 0.121 | 0.101 |
| H2O | 0 | 0 | 0.137 | 0.385 | 0.385 | 0.385 | 0.489 |
| CO2 | 0 | 0.008 | 0.068 | 0.013 | 0.013 | 0.013 | 0.011 |

TABLE 5-continued (CB Grade B: Temp. 500° C.)

| FSPH05 Carbon Black B, FS@500 C. | 01AIR | 02NATGAS | 04BURNX | 07QNCHX | 08APHX | 08FSHTRX | 12TGAS |
|---|---|---|---|---|---|---|---|
| CO | 0 | 0 | 0.005 | 0.103 | 0.103 | 0.103 | 0.086 |
| SO2 | 0 | 0 | 0 | 0 | 0 | 0 | 0 |
| CH4 | 0 | 0.961 | 0 | 0 | 0 | 0 | 0 |
| C2H2 | 0 | 0 | 0 | 0 | 0 | 0 | 0 |
| C2H6 | 0 | 0.021 | 0 | 0 | 0 | 0 | 0 |
| C3H8 | 0 | 0.005 | 0 | 0 | 0 | 0 | 0 |
| N-BUT | 0 | 0.001 | 0 | 0 | 0 | 0 | 0 |
| N-PENT | 0 | 0.001 | 0 | 0 | 0 | 0 | 0 |
| N-HEXANE | 0 | 0 | 0 | 0 | 0 | 0 | 0 |
| HCN | 0 | 0 | 0 | 0 | 0 | 0 | 0 |
| H3N | 0 | 0 | 0 | 0 | 0 | 0 | 0 |
| H2S | 0 | 0 | 0 | 0.003 | 0.003 | 0.003 | 0.002 |
| H | 0 | 0 | 0 | 0 | 0 | 0 | 0 |
| O | 0 | 0 | 0.001 | 0 | 0 | 0 | 0 |
| OH | 0 | 0 | 0.007 | 0 | 0 | 0 | 0 |
| NO | 0 | 0 | 0.008 | 0 | 0 | 0 | 0 |
| Tail gas HHV, J/kg | | 5.38E+07 | 9.79E+04 | 3.07E+06 | 3.07E+06 | 3.07E+06 | 2.62E+06 |

TABLE 6

(CB Grade B: Temp. 700° C.)

| FSPH06 Carbon Black B, with FS@700 C. | 01AIR | 02NATGAS | 04BURNX | 07QNCHX | 08APHX | 08FSHTRX | 12TGAS |
|---|---|---|---|---|---|---|---|
| Substream: MIXED | | | | | | | |
| Temperature C. | 760 | 20 | | 907 | 653 | 449 | 250 |
| Vapor Frac | 1 | 1 | 1 | 1 | 1 | 1 | 1 |
| Mole Flow kmol/hr | 608 | 46 | 660 | 1,396 | 1,396 | 1,396 | 1,594 |
| Mole Flow scmh | 13,635 | 1,041 | 14,784 | 31,293 | 31,293 | 31,293 | 35,734 |
| Mass Flow kg/hr | 17,617 | 782 | 18,399 | 28,623 | 28,623 | 28,623 | 32,193 |
| Enthalpy J/kg | 7.9E+05 | −4.6E+06 | 5.6E+05 | −4.0E+06 | −4.4E+06 | −4.8E+06 | −6.0E+06 |
| Enthalpy J/sec | 3.9E+06 | −1.0E+06 | 2.9E+06 | −3.2E+07 | −3.5E+07 | −3.8E+07 | −5.3E+07 |
| Mole Frac | | | | | | | |
| AR | 0.009 | 0 | 0.009 | 0.004 | 0.004 | 0.004 | 0.004 |
| N2 | 0.781 | 0.004 | 0.717 | 0.341 | 0.341 | 0.341 | 0.299 |
| O2 | 0.21 | 0 | 0.047 | 0 | 0 | 0 | 0 |
| H2 | 0 | 0 | 0.002 | 0.144 | 0.144 | 0.144 | 0.126 |
| H2O | 0 | 0 | 0.137 | 0.4 | 0.4 | 0.4 | 0.475 |
| CO2 | 0 | 0.008 | 0.068 | 0.01 | 0.01 | 0.01 | 0.008 |
| CO | 0 | 0 | 0.005 | 0.099 | 0.099 | 0.099 | 0.087 |
| SO2 | 0 | 0 | 0 | 0 | 0 | 0 | 0 |
| CH4 | 0 | 0.961 | 0 | 0 | 0 | 0 | 0 |
| C2H2 | 0 | 0 | 0 | 0 | 0 | 0 | 0 |
| C2H6 | 0 | 0.021 | 0 | 0 | 0 | 0 | 0 |
| C3H8 | 0 | 0.005 | 0 | 0 | 0 | 0 | 0 |
| N-BUT | 0 | 0.001 | 0 | 0 | 0 | 0 | 0 |
| N-PENT | 0 | 0.001 | 0 | 0 | 0 | 0 | 0 |
| N-HEXANE | 0 | 0 | 0 | 0 | 0 | 0 | 0 |
| HCN | 0 | 0 | 0 | 0 | 0 | 0 | 0 |
| H3N | 0 | 0 | 0 | 0 | 0 | 0 | 0 |
| H2S | 0 | 0 | 0 | 0.003 | 0.003 | 0.003 | 0.002 |
| H | 0 | 0 | 0 | 0 | 0 | 0 | 0 |
| O | 0 | 0 | 0.001 | 0 | 0 | 0 | 0 |
| OH | 0 | 0 | 0.007 | 0 | 0 | 0 | 0 |
| NO | 0 | 0 | 0.008 | 0 | 0 | 0 | 0 |
| Tail gas HHV, J/kg | | 5.38E+07 | 9.79E+04 | 3.45E+06 | 3.45E+06 | 3.45E+06 | 3.06E+06 |

TABLE 7

| | Units | Reference 215 C. FS preheat, Carbon Blacks A & B | | 500 C. FS preheat, Carbon Black A | | 700 C. FS preheat, Carbon Black B | |
|---|---|---|---|---|---|---|---|
| | | FSPH01 | FSPH02 | FSPH03 | FSPH04 | FSPH05 | FSPH06 |
| Carbon Black Grade | | A | B | A | A | B | B |
| CB Yield | % | 100 | 100 | 107 | 115 | 109 | 120 |
| Reactor Energy Efficiency | % | 100 | 100 | 111 | 126 | 114 | 131 |

TABLE 7-continued

| | Units | Reference 215 C. FS preheat, Carbon Blacks A & B | | 500 C. FS preheat, Carbon Black A | | 700 C. FS preheat, Carbon Black B | |
|---|---|---|---|---|---|---|---|
| | | FSPH01 | FSPH02 | FSPH03 | FSPH04 | FSPH05 | FSPH06 |
| N2SA | m2/gm | <100 | >100 | <100 | <100 | >100 | >100 |
| Burner Stoichiometry | % | 135 | 135 | 135 | 135 | 135 | 135 |
| Air Preheat Temperature | C. | 710 | 760 | 710 | 710 | 760 | 760 |
| Feedstock Temp | C. | 215 | 215 | 500 | 700 | 500 | 700 |
| Feedstock Enthalpy | MJ/kg kWh/kg | 1.0 | 0.7 | 2.0 | 3.1 | 1.7 | 2.8 |
| Electrical Power | CB | 0.11 | 0.19 | 0.08 | 0.05 | 0.15 | 0.10 |
| CO2 produced | % | 100 | 100 | 74 | 49 | 77 | 55 |
| Natural Gas Temp | C. | 15 | 15 | 15 | 15 | 15 | 15 |
| Natural Gas Flow | Ncmh | 1,356 | 1,041 | 1,356 | 1,356 | 1,041 | 1,041 |
| Air Flow | Ncmh | 17,750 | 13,635 | 17,750 | 17,750 | 13,635 | 13,635 |
| Air Temp | C. | 25 | 25 | 25 | 25 | 25 | 25 |

As shown by the results, raw material cost savings in excess of 10% can be obtained where the feedstock is preheated to 500° C., and in excess of 20% when the feedstock is preheated to 700° C., in a stable mode without feedstock fouling as compared to processing at a lower conventional feedstock temperature of 215° C. The "CB Yield" and some other data in Table 7 are using the conventional feedstock temperature of 215° C. as the base line (100%) and comparing the higher temperature preheated feedstocks to this base line. As indicated, the fouling control approaches of the present invention make it feasible to operate at such higher feedstock temperatures, including at industrial scale operations. In Table 7, reactor energy efficiency (REE) is defined as a ratio of heating value of the produced material to the combined energy input, which includes heating values of feedstock (FS) and burner fuel and electric energy REE=(HHV–CB)/(HHV–feedstock+HHV–Natural Gas+kWh/kg–CB Electric Energy). In Table 7, burner stoichiometry is defined as a percent of the burner air flow to the burner stoichiometric air flow (air flow required for complete combustion of the burner fuel).

The benefits set forth in this model would be achieved with any carbon black, such as any ASTM grade, like N100 to N1000 and the like. The modeling would show the same benefits.

Example 2

In these examples, nine test runs were made to show examples of heating carbon black yielding feedstock from 70° C. to approximately 500° C. using various feedstock samples as explained further below. The various operating parameters are set forth in Table 8 and, further, the type of feedstock used is set forth in Table 8, and the details of the feedstock are set forth in Table 9. As can be seen in Table 8, by following the present invention, the carbon black yielding feedstock can be preheated to temperatures on the order of 500° C. or more and yet obtain successful and continuous production of carbon black. In the carbon black formed from the test numbers 2-5, 8, and 9, analysis was made on the carbon black, and it was determined that the carbon black was acceptable for commercial use as carbon blacks based on morphology, purity, and the like. It was determined that one advantage of the carbon blacks made from the present invention was that the PAH levels of the carbon blacks were on the order of about 50% less PAH (on a ppm level) than conventional blacks having the same morphology. Thus, one additional advantage of the present invention is the ability to form commercially-acceptable carbon blacks having a much lower PAH amount. The PAH determination was based on a PAH-20 determination as understood in the art.

As further set forth below in Table 8, the entry for "runaway pressure drop" is an indication on whether vapor film and/or coking was forming or about to form or not. When an entry says "NO," this means no runaway pressure drop was detected and, in fact, the test run was considered a success since it produced commercially-acceptable carbon black with no coke formation and no vapor filming to the heater lines or supply lines. When the entry for runaway pressure drop is "YES," this is an indication that there was a rapid pressure drop from the steady state operating conditions during the manufacturing of carbon black, which was a clear indication that vapor filming was occurring and that coking of the apparatus was inevitable. In fact, in Test No. 1, to confirm this understanding, a runaway pressure drop was seen in Test No. 1, and, ultimately, upon analysis of the parts of the feedstock heater, coking was visually detected in the feedlines in the heater to confirm that the runaway pressure drop was an indication of the inevitable formation of coking.

Examples 2-5, 8, and 9 clearly show that carbon black can be made using high temperature feedstocks and yet avoid the formation of vapor filming and coking and lead to a commercially-acceptable carbon black product.

In Examples 1, 6, and 7, where runaway pressure drop was identified and where coking occurred in Test No. 1, by using the present invention, these test runs could be adjusted to avoid a runaway pressure drop and therefore the formation of vapor film and/or coking by adjusting the heater inlet pressure or raising the heater inlet pressure and/or increasing the oil inlet velocity and/or reducing the residence time in the heater. By increasing the heater inlet pressure, for instance, 10% or more, this would have an effect on avoiding the formation of vapors in the heater during the preheating of the carbon black yielding feedstock. Essentially, any combination of adjusting the heater inlet pressure (typically by raising the pressure), increasing the oil inlet velocity, and/or decreasing the residence time can reduce vapor forming and/or eliminate vapor forming and therefore avoid a runaway pressure drop.

In the Examples below, for Examples 2-5, 8 and 9, a carbon black yield improvement (by wt %) was achieved compared to carbon black made using a conventional feedstock temperature of 215° C. as the base line (100%) and comparing the higher temperature preheated feedstocks to this base line. The carbon black yield improved from 4% to 8% (by wt) in these examples. Further, the examples of the present invention provided a energy savings of from 7% to 11% compared to carbon black made using the conventional feedstock temperature of 215° C. as the base line (100%) and comparing the energy used for the higher temperature preheated feedstocks to this base line. Thus, the present invention provides a higher yield of carbon black and uses less energy to do so, and this is superior to the conventional processes and unexpected as well.

TABLE 8

| | Test Number | | | | | | | | |
|---|---|---|---|---|---|---|---|---|---|
| | 1 | 2 | 3 | 4 | 5 | 6 | 7 | 8 | 9 |
| Preheat Temperature (° C.) | 545 | 503 | 500 | 504 | 501 | 500 | 462 | 515 | 515 |
| Heater inlet (bar) | 46 | 74.4 | 83 | 58.7 | 50 | 9 | 5 | 51 | 52 |
| Heater pressure drop (bar) | 6.3 | 18.4 | 21.2 | 7.2 | 7.4 | 6.5 | 8.2 | 6.3 | 6.6 |
| Oil flow rate (kg/hr) | 90 | 105 | 145 | 104 | 105 | 95 | 110 | 432 | 453 |
| Heat flux (kW/m$^2$) | 38 | 44.3 | 61 | 39.2 | 39 | 30 | 31 | 36.5 | 39.7 |
| Oil inlet velocity (m/s) | 1.5 | 1.8 | 2.5 | 1.6 | 1.6 | 1.5 | 1.7 | 1.3 | 1.4 |
| Oil specific mas flow (kg/s-m$^2$) | 1523 | 1777 | 2453 | 1760 | 1777 | 1607 | 1861 | 1539 | 1540 |
| Residence time in heater (s) | 28 | 23 | 17 | 25 | 25 | 23 | 26 | 82 | 77 |
| Feedstock | FS 1 | FS 1 | FS 1 | FS 2 | FS 2 | FS 3 | FS 3 | FS 3 | FS 3 |
| Runaway Pressure Drop | Yes* | No | No | No | No | Yes** | Yes** | No | No |

*Presence of Coking confirmed.
**Experiment immediately stopped to avoid damage to heater/reactor

TABLE 9

| | Feedstock 1 (FS1) | Feedstock 2 (FS2) | Feedstock 3 (FS3) |
|---|---|---|---|
| Specific Gravity | 0.99 | 1.01 | 1.09 |
| Carbon (wt %) | 89.88 | 90.99 | 90.82 |
| Hydrogen (wt %) | 9.3 | 7.5 | 7.6 |
| Oxygen (wt %) | 0.5 | — | 0.42 |
| Nitrogen (wt %) | 0.15 | 0.21 | 0.35 |
| Sulfur (wt %) | 0.17 | 0.74 | 0.84 |
| Asphaltenes (wt %) | 1.9 | 3.9 | 2.0 |
| Viscocity (cP) @ 50° C. | 7 | 243 | 58 |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for producing carbon black comprising:
introducing a heated gas stream into a carbon black reactor;
supplying at least one carbon black-yielding feedstock to at least one heater;
preheating said at least one carbon black-yielding feedstock in said at least one heater to a temperature of greater than 300° C. to provide a preheated carbon black-yielding feedstock, wherein (a) the at least one carbon black-yielding feedstock has a velocity through said at least one heater of about 1 msec or higher at the smallest cross-sectional area of a feedstock line in said heater, wherein velocity is an average velocity calculated based on a feedstock density measured at 60° C. at 1 atm and (b) the at least one carbon black-yielding feedstock has a first feedstock residence time in said heater of less than about 120 minutes;
supplying said preheated carbon black-yielding feedstock having said temperature of greater than 300° C. to at least one feedstock introduction point to the carbon black reactor, wherein said preheated carbon black-yielding feedstock having said temperature of greater than 300° C. has a second feedstock residence time of from exiting said at least one heater to the introduction point to said carbon black reactor of less than about 120 minutes; and wherein said first feedstock residence time and said second feedstock residence time combined are 120 minutes or less; whereby vapor film formation is controlled in said at least one heater and prior to said supplying to said carbon black reactor;
combining at least said preheated carbon black-yielding feedstock through the at least one introduction point to said carbon black reactor with the heated gas stream to form a reaction stream in which carbon black is formed in said carbon black reactor; and
recovering the carbon black in the reaction stream, and wherein said carbon black is furnace carbon black and said carbon black reactor is a furnace carbon black reactor, and said carbon black-yielding feedstock has an initial boiling point of from about 160° C. to about 600° C.

2. The method of claim 1, further comprising pressurizing said carbon black-yielding feedstock to have a pressure greater than about 10 bar prior to entering said at least one heater.

3. The method of claim 1, further comprising pressurizing said carbon black-yielding feedstock to have a pressure of greater than about 20 bar prior to entering said at least one heater.

4. The method of claim 1, further comprising pressurizing said carbon black-yielding feedstock to a pressure of from about 20 bar to about 180 bar prior to entering said at least one heater.

5. The method of claim 1, wherein said velocity of at least about 1.6 m/sec.

6. The method of claim 1, wherein said carbon black-yielding feedstock comprises decant oil, coal tar product, ethylene cracker residues, asphaltene containing oil, or any combination thereof.

7. The method of claim 1, wherein said preheating of the at least one carbon black-yielding feedstock comprises heating said carbon-black-yielding feedstock in said heater that has a heat exchanger operating at an average heat flux of greater than about 10 kW/m².

8. The method of claim 1, wherein at least a portion of said preheating occurs in said at least one heater that has heat at least partially provided by heat generated by said carbon black reactor or other carbon black reactor or both.

9. The method of claim 1, wherein said first residence time and said second residence time combined are less than 60 minutes.

10. The method of claim 1, wherein said at least one heater is in heat exchange with at least a portion of said carbon black reactor.

11. The method of claim 1, wherein said at least one heater contacts said reaction stream in said carbon black reactor downstream of a quencher, wherein said at least one heater comprises a heat exchanger having walls heated by said reaction stream on a first side thereof and contacting said carbon black-yielding feedstock on an opposite side thereof.

12. The method of claim 1, wherein said at least one heater includes a heat exchanger that heat exchanges with said reaction stream in said carbon black reactor, wherein a flowable heat carrier that flows through the heat exchanger is heated, and the heated flowable heat carrier passes through said at least one heater positioned external to the reactor and operable to exchange heat of the flowable heat carrier with the feedstock to heat said carbon black-yielding feedstock.

13. The method of claim 1, wherein said at least one heater is at least partially heat sourced with carbon black tail gas from said carbon black reactor or a different carbon black reactor or both, to heat the carbon black-yielding feedstock.

14. The method of claim 1, further comprising providing a non-catalytic surface on carbon black-yielding feedstock contacting walls of said at least one heater and inner walls of at least one feedstock supply line that supplies said preheated carbon black-yielding feedstock to said carbon black reactor, wherein the surface is non-catalytic to cracking or polymerization of hydrocarbons.

15. The method of claim 1, wherein said supplying comprises feeding said preheated carbon black-yielding feedstock through at least one feedstock supply line that supplies to said carbon black reactor, and said method further comprises periodically feeding a purge gas comprising an oxidant for carbon through the at least one carbon black-yielding feedstock supply line.

16. The method of claim 1, wherein said supplying comprises feeding said preheated carbon black-yielding feedstock through at least one feedstock supply line that supplies to said carbon black reactor, and said method further comprises injecting the preheated carbon black yielding feedstock into the carbon black reactor with at least partially flashing of the carbon black-yielding feedstock.

17. The method of claim 1, further comprising combining the preheated carbon black-yielding feedstock and the heated gas stream in the carbon black reactor to continuously form carbon black in the reactor for at least about 12 hours.

18. A method for producing carbon black comprising:
introducing a heated gas stream into a carbon black reactor;
supplying at least one carbon black-yielding feedstock having a first temperature of below 360° C. to at least one heater;
preheating said at least one carbon black-yielding feedstock in said at least one heater to a second temperature of from about 360° C. to about 850° C. to provide a preheated carbon black-yielding feedstock, wherein (a) the at least one carbon black-yielding feedstock has a velocity through said at least one heater of about 1 m/sec or higher at the smallest cross-sectional area of a feedstock line in said heater, wherein velocity is an average velocity calculated based on a feedstock density measured at 60° C. at 1 atm and (b) the at least one carbon black-yielding feedstock has a first feedstock residence time in said heater of less than about 120 minutes;
supplying said preheated carbon black-yielding feedstock having said temperature of 360° C. or greater to at least one feedstock introduction point to the carbon black reactor, wherein said preheated carbon black-yielding feedstock having said temperature of 360° C. or greater has a second feedstock residence time of from exiting said at least one heater to the introduction point to said carbon black reactor of less than about 120 minutes; and wherein said first feedstock residence time and said second feedstock residence time combined are from about 10 seconds to about 120 minutes; whereby vapor film formation is controlled in said at least one heater and prior to said supplying to said carbon black reactor;
combining at least said preheated carbon black-yielding feedstock through the at least one introduction point to said carbon black reactor with the heated gas stream to form a reaction stream in which carbon black is formed in said carbon black reactor; and
recovering the carbon black in the reaction stream, and wherein said carbon black is furnace carbon black and said carbon black reactor is a furnace carbon black reactor, and said carbon black-yielding feedstock has an initial boiling point of from about 160° C. to about 600° C.

19. The method of claim 18, further comprising pressurizing said carbon black-yielding feedstock to have a pressure greater than about 20 bar prior to entering said at least one heater.

20. The method of claim 18, further comprising pressurizing said carbon black-yielding feedstock to have a pressure of greater than about 30 bar prior to entering said at least one heater.

21. The method of claim 18, further comprising pressurizing said carbon black-yielding feedstock to a pressure of from about 30 bar to about 180 bar prior to entering said at least one heater.

22. The method of claim 18, wherein said velocity is at least about 1.6 m/sec.

23. The method of claim 18, wherein said carbon black-yielding feedstock comprises decant oil, coal tar product, ethylene cracker residues, asphaltene containing oil, or any combination thereof.

24. The method of claim 18, wherein said preheating of the at least one carbon black-yielding feedstock comprises heating said carbon-black-yielding feedstock in said heater that has a heat exchanger operating at an average heat flux of greater than about 20 kW/m$^2$.

25. The method of claim 18, wherein at least a portion of said preheating occurs in said at least one heater that has heat at least partially provided by heat generated by said carbon black reactor or other carbon black reactor or both.

26. The method of claim 18, wherein said first residence time and said second residence time combined are less than 60 minutes.

27. The method of claim 18, wherein said at least one heater is in heat exchange with at least a portion of said carbon black reactor.

28. The method of claim 18, wherein said at least one heater contacts said reaction stream in said carbon black reactor downstream of a quencher, wherein said at least one heater comprises a heat exchanger having walls heated by said reaction stream on a first side thereof and contacting said carbon black-yielding feedstock on an opposite side thereof before said carbon black-yielding feedstock.

29. The method of claim 18, wherein said at least one heater includes a heat exchanger that heat exchanges with said reaction stream in said carbon black reactor, wherein a flowable heat carrier that flows through the heat exchanger is heated, and the heated flowable heat carrier passes through said at least one heater positioned external to the reactor and operable to exchange heat of the flowable heat carrier with the feedstock to heat said carbon black-yielding feedstock.

30. The method of claim 18, wherein said at least one heater is at least partially heat sourced with carbon black tail gas from said carbon black reactor or a different carbon black reactor or both, to heat the carbon black-yielding feedstock.

31. The method of claim 18, further comprising providing a non-catalytic surface on carbon black-yielding feedstock contacting walls of said at least one heater and inner walls of at least one feedstock supply line that supplies said preheated carbon black-yielding feedstock to said carbon black reactor, wherein the surface is non-catalytic to cracking or polymerization of hydrocarbons.

32. The method of claim 18, wherein said supplying comprises feeding said preheated carbon black-yielding feedstock through at least one feedstock supply line that supplies to said carbon black reactor, and said method further comprises periodically feeding a purge gas comprising an oxidant for carbon through the at least one carbon black-yielding feedstock supply line.

33. The method of claim 18, wherein said supplying comprises feeding said preheated carbon black-yielding feedstock through at least one feedstock supply line that supplies to said carbon black reactor, and said method further comprises injecting the preheated carbon black yielding feedstock into the carbon black reactor with at least partially flashing of the carbon black-yielding feedstock.

34. The method of claim 18, further comprising combining the preheated carbon black-yielding feedstock and the heated gas stream in the carbon black reactor to continuously form carbon black in the reactor for at least about 12 hours.

35. A method for producing carbon black comprising:
introducing a heated gas stream into a carbon black reactor;
supplying at least one carbon black-yielding feedstock having a first temperature of below 450° C. to at least one heater;
preheating said at least one carbon black-yielding feedstock in said at least one heater to a second temperature of greater than 450° C. to provide a preheated carbon black-yielding feedstock, wherein (a) the at least one carbon black-yielding feedstock has a velocity through said at least one heater of about 1 msec or higher at the smallest cross-sectional area of a feedstock line in said heater, wherein velocity is an average velocity calculated based on a feedstock density measured at 60° C. at 1 atm and (b) the at least one carbon black-yielding feedstock has a first feedstock residence time in said heater of from 10 seconds to about 120 minutes;
supplying said preheated carbon black-yielding feedstock having said temperature of greater than 450° C. to at least one feedstock introduction point to the carbon black reactor, wherein said preheated carbon black-yielding feedstock having said temperature of greater than 450° C. has a second feedstock residence time of from exiting said at least one heater to the introduction point to said carbon black reactor of less than about 120 minutes; and wherein said first feedstock residence time and said second feedstock residence time combined are 120 minutes or less; whereby vapor film formation is controlled in said at least one heater and prior to said supplying to said carbon black reactor;
combining at least said preheated carbon black-yielding feedstock through the at least one introduction point to said carbon black reactor with the heated gas stream to form a reaction stream in which carbon black is formed in said carbon black reactor; and
recovering the carbon black in the reaction stream, and wherein said carbon black is furnace carbon black and said carbon black reactor is a furnace carbon black reactor, and said carbon black-yielding feedstock has an initial boiling point of from about 160° C. to about 600° C.

36. The method of claim 35, further comprising pressurizing said carbon black-yielding feedstock to have a pressure of from about 20 bar to about 180 bar prior to entering said at least one heater.

37. The method of claim 35, further comprising pressurizing said carbon black-yielding feedstock to have a pressure of from about 30 bar to about 180 bar prior to entering said at least one heater.

38. The method of claim 35, further comprising pressurizing said carbon black-yielding feedstock to a pressure of from about 40 bar to about 180 bar prior to entering said at least one heater.

39. The method of claim 35, wherein said velocity is at least about 1.6 msec.

40. The method of claim 35, wherein said carbon black-yielding feedstock comprises decant oil, coal tar product, ethylene cracker residues, asphaltene containing oil, or any combination thereof.

41. The method of claim 35, wherein said preheating of the at least one carbon black-yielding feedstock comprises heating said carbon-black-yielding feedstock in said heater that has a heat exchanger operating at an average heat flux of from about 20 kW/m$^2$ to about 150 kW/m$^2$.

42. The method of claim 35, wherein at least a portion of said preheating occurs in said at least one heater that has heat at least partially provided by heat generated by said carbon black reactor or other carbon black reactor or both.

43. The method of claim 35, wherein said first residence time and said second residence time combined are less than 60 minutes.

44. The method of claim 35, wherein said at least one heater is in heat exchange with at least a portion of said carbon black reactor.

45. The method of claim 35, wherein said at least one heater contacts said reaction stream in said carbon black reactor downstream of a quencher, wherein said at least one heater comprises a heat exchanger having walls heated by said reaction stream on a first side thereof and contacting said carbon black-yielding feedstock on an opposite side thereof before said carbon black-yielding feedstock.

46. The method of claim 35, wherein said at least one heater includes a heat exchanger that heat exchanges with said reaction stream in said carbon black reactor, wherein a flowable heat carrier that flows through the heat exchanger is heated, and the heated flowable heat carrier passes through said at least one heater positioned external to the reactor and operable to exchange heat of the flowable heat carrier with the feedstock to heat said carbon black-yielding feedstock.

47. The method of claim 35, wherein said at least one heater is at least partially heat sourced with carbon black tail gas from said carbon black reactor or a different carbon black reactor or both, to heat the carbon black-yielding feedstock.

48. The method of claim 35, further comprising providing a non-catalytic surface on carbon black-yielding feedstock contacting walls of said at least one heater and inner walls of at least one feedstock supply line that supplies said preheated carbon black-yielding feedstock to said carbon black reactor, wherein the surface is non-catalytic to cracking or polymerization of hydrocarbons.

49. The method of claim 35, wherein said supplying comprises feeding said preheated carbon black-yielding feedstock through at least one feedstock supply line that supplies to said carbon black reactor, and said method further comprises periodically feeding a purge gas comprising an oxidant for carbon through the at least one carbon black-yielding feedstock supply line.

50. The method of claim 35, wherein said supplying comprises feeding said preheated carbon black-yielding feedstock through at least one feedstock supply line that supplies to said carbon black reactor, and said method further comprises injecting the preheated carbon black yielding feedstock into the carbon black reactor with at least partially flashing of the carbon black-yielding feedstock.

51. The method of claim 35, further comprising combining the preheated carbon black-yielding feedstock and the heated gas stream in the carbon black reactor to continuously form carbon black in the reactor for at least about 12 hours.

52. A method for producing carbon black comprising:
introducing a heated gas stream into a carbon black reactor;
supplying at least one carbon black-yielding feedstock having a first temperature of below 400° C. to at least one heater at a first pressure of greater than 10 bar;
preheating said at least one carbon black-yielding feedstock in said at least one heater to a second temperature of greater than 400° C. to provide a preheated carbon black-yielding feedstock, wherein (a) the at least one carbon black-yielding feedstock has a second pressure in said at least one heater that is about the same or lower than said first pressure, as calculated based on assuming same cross-sectional area that feedstock travels in during first pressure and second pressure and (b) the at least one carbon black-yielding feedstock has a first feedstock residence time in said heater of less than about 120 minutes;
supplying said preheated carbon black-yielding feedstock having said temperature of greater than 400° C. to at least one feedstock introduction point to the carbon black reactor, wherein said preheated carbon black-yielding feedstock having said temperature of greater than 400° C. has a second feedstock residence time of from exiting said at least one heater to right at the introduction point to said carbon black reactor of less than about 120 minutes; and wherein said first feedstock residence time and said second feedstock residence time combined are 120 minutes or less; wherein supplying said preheated carbon black-yielding feedstock at a temperature of greater than 400° C. at said pressure controls formation of vapor film in said at least one heater and prior to said supplying to said carbon black reactor;
combining at least said preheated carbon black-yielding feedstock through the at least one introduction point to said carbon black reactor with the heated gas stream to form a reaction stream in which carbon black is formed in said carbon black reactor; and
recovering the carbon black in the reaction stream, and wherein said carbon black is furnace carbon black and said carbon black reactor is a furnace carbon black reactor, and said carbon black-yielding feedstock has an initial boiling point of from about 160° C. to about 600° C.

53. A method for producing carbon black comprising:
introducing a heated gas stream into a carbon black reactor;
supplying at least one carbon black-yielding feedstock having a first temperature of below 300° C. to at least one heater at a first pressure of greater than 10 bar;
preheating said at least one carbon black-yielding feedstock in said at least one heater to a second temperature of greater than 300° C. to provide a preheated carbon black-yielding feedstock, wherein the at least one carbon black-yielding feedstock has i) a second pressure in said at least one heater that is about the same or lower than said first pressure and ii) the at least one carbon black-yielding feedstock has a velocity in said at least one heater of about 1 m/sec or higher at the smallest cross-sectional area of a feedstock line in said heater, wherein velocity is an average velocity calculated based on a feedstock density measured at 60° C. at 1 atm and wherein i) is calculated based on same cross-sectional area that feedstock travels in during first pressure and second pressure; and
supplying said preheated carbon black-yielding feedstock having said temperature of greater than 300° C. to at least one feedstock introduction point to the carbon black reactor; wherein supplying said preheated carbon black-yielding feedstock at a temperature of greater than 300° C. at said pressure controls formation of vapor film in said at least one heater and prior to said supplying to said carbon black reactor;
combining at least said preheated carbon black-yielding feedstock through the at least one introduction point to said carbon black reactor with the heated gas stream to form a reaction stream in which carbon black is formed in said carbon black reactor; and
recovering the carbon black in the reaction stream, and wherein said carbon black is furnace carbon black and said carbon black reactor is a furnace carbon black reactor, and said carbon black-yielding feedstock has an initial boiling point of from about 160° C. to about 600° C.

54. The method of claim 1, wherein said preheating and said supplying is in the absence of a runaway pressure drop based on steady state operating conditions.

55. A method for producing carbon black comprising:
introducing a heated gas stream into a carbon black reactor;
supplying at least one carbon black-yielding feedstock to at least one heater;
preheating said at least one carbon black-yielding feedstock in said at least one heater to a temperature of greater than 300° C. to provide a preheated carbon black-yielding feedstock, wherein (a) the at least one carbon black-yielding feedstock has a velocity through said at least one heater of about 1 m/sec or higher at the smallest cross-sectional area of a feedstock line in said heater, wherein velocity is an average velocity calculated based on a feedstock density measured at 60° C. at 1 atm and (b) the at least one carbon black-yielding feedstock has a first feedstock residence time in said heater of less than about 120 minutes;
supplying said preheated carbon black-yielding feedstock having said temperature of greater than 300° C. to at least one feedstock introduction point to the carbon black reactor, wherein said preheated carbon black-yielding feedstock having said temperature of greater than 300° C. has a second feedstock residence time of from exiting said at least one heater to right at the introduction point to said carbon black reactor of less than about 120 minutes; and wherein said first feedstock residence time and said second feedstock residence time combined are 120 minutes or less; wherein said preheated carbon black-yielding feedstock at a temperature of greater than 300° C. is at a sufficient pressure to control formation of vapor film in said at least one heater and prior to said supplying to said carbon black reactor;
combining at least said preheated carbon black-yielding feedstock through the at least one introduction point to said carbon black reactor with the heated gas stream to form a reaction stream in which carbon black is formed in said carbon black reactor; and
recovering the carbon black in the reaction stream, and wherein said carbon black is furnace carbon black and said carbon black reactor is a furnace carbon black reactor, and said carbon black-yielding feedstock has an initial boiling point of from about 160° C. to about 600° C.

* * * * *